United States Patent
Georges et al.

(10) Patent No.: US 6,906,630 B2
(45) Date of Patent: Jun. 14, 2005

(54) TRANSFORMER MANAGEMENT SYSTEM AND METHOD

(75) Inventors: Bruno Georges, Quebec (CA); Mariana Barbulescu, Quebec (CA); Estelle Gagnon, Quebec (CA); Claude Beauchemin, Valleyfield (CA)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 09/794,953

(22) Filed: Feb. 28, 2001

(65) Prior Publication Data

US 2002/0161558 A1 Oct. 31, 2002

(51) Int. Cl.$^7$ .............................................. G08B 21/00
(52) U.S. Cl. ..................................... 340/646; 340/657
(58) Field of Search ................................ 340/646, 657, 340/660, 661, 662, 663, 664, 588, 643, 679, 310.01, 310.07; 702/181, 182, 183; 363/59, 60; 200/292, 293; 361/35, 94, 97, 63

(56) References Cited

U.S. PATENT DOCUMENTS

| | | | | |
|---|---|---|---|---|
| 4,654,806 A | * | 3/1987 | Poyser et al. ................ 340/646 |
| 5,057,962 A | | 10/1991 | Alley et al. .................... 361/24 |
| 5,534,853 A | * | 7/1996 | Pioch .......................... 340/646 |
| 5,781,764 A | * | 7/1998 | Degeneff et al. ........... 395/500 |
| 5,838,881 A | | 11/1998 | Nelson et al. ................. 395/22 |
| 5,847,945 A | * | 12/1998 | Burtin et al. .................. 363/60 |
| 5,892,430 A | * | 4/1999 | Wiesman et al. ....... 340/310.01 |
| 6,396,279 B1 | * | 5/2002 | Gruenert ...................... 324/424 |
| 6,424,266 B1 | * | 7/2002 | Weekes et al. .............. 340/646 |
| 6,446,027 B1 | * | 9/2002 | O'Keeffe et al. ........... 702/183 |
| 6,609,079 B1 | * | 8/2003 | Seitlinger .................... 340/646 |

* cited by examiner

Primary Examiner—Van T. Trieu
(74) Attorney, Agent, or Firm—Nixon & Vanderhye PC/GE

(57) ABSTRACT

A transformer management system and method involves using sensors to sense physical quantities associated with the operation of a transformer. Processing circuitry uses the sensed physical quantities to calculate values from mathematical models for representing behavior of the transformer. These calculated values are compared to threshold values and an output is generated based on the result of the comparison.

52 Claims, 18 Drawing Sheets

TRANSFORMER MANAGEMENT SYSTEM AND METHOD

FIELD OF THE INVENTION

The present invention generally relates to transformers and, more particularly, to systems and methods for managing transformers based on sensor signals supplied to mathematical models for modeling transformer behavior.

BACKGROUND OF THE INVENTION

A grid of power lines typically distributes electricity. These power lines spread out from a main generator station and convey the electricity to numerous substations. The voltage of this electricity is stepped up for efficient conducting of electric power. Each substation contains one or more power transformers that are used to step down the voltage to lower levels for subsequent conducting through a distribution network. The distribution network has numerous smaller distribution transformers, which lower the voltage of the electricity conveyed to households or other end users. Conventionally, the input voltage is called the primary voltage and the output voltage is called the secondary voltage.

Transformers are well known and normally include a transformer core and winding subassembly placed in a housing. A typical housing includes a tank containing transformer fluid (e.g., mineral oil) which electrically insulates and absorbs heat from the immersed transformer core and winding subassembly. Vanes attached to the tank transfer such heat to the atmosphere, with such heat transfer usually aided by cooling fans blowing against the vanes. There may be various cooling stages (e.g., stage 2–50% of pumps and fans; stage 3–100% of pumps and fans).

Online transformer monitoring systems are known for monitoring transformer operations to detect malfunctions. Existing online transformer monitoring systems are based on directly comparing measured quantities to threshold values (constants). While this allows power producers and distributors to ascertain when certain measured quantities fall outside the threshold values, this approach generates a relatively large number of false alarms of transformer malfunction.

SUMMARY OF THE INVENTION

In today's deregulated electrical markets, power producers and distributors require current and accurate information on the health of their equipment to ensure that they can supply dependable, uninterrupted power at a marketable price. In order to do this, it is necessary to prevent equipment failures that would result in forced outage, while at the same time not generating false alarms indicating non-existent equipment problems.

The systems and methods described herein involve using monitored parameter values of a transformer as inputs to one or more mathematical models that model the behavior of the transformer. The models outputs are compared with threshold values and outputs such as alarms and control signals are generated based on the comparison. This approach provides accurate current information about the health of a transformer and allows utilities to plan and schedule maintenance in advance. This approach can significantly reduce maintenance costs for utilities as unnecessary maintenance can be avoided and the risk of a transformer having a forced outage is greatly reduced. This approach can also be used to "authorize" running a transformer in overload status to benefit electrical spot market high sale values.

In accordance with one aspect of the present invention, a transformer management system includes sensors for sensing physical quantities associated with the operation of a transformer and processing circuitry for using the sensed physical quantities to calculate values from mathematical models for representing behavior of the transformer. The calculated values are compared to threshold values and an output is generated based on the result of the comparison. The output may, for example, be an alarm or an ON/OFF cooling system control signal.

In accordance with another aspect of the present invention, a method for managing a transformer involves sensing physical quantities associated with the operation of a transformer. The sensed physical quantities are used to calculate values from mathematical models for representing the behavior of the transformer. The calculated values are compared to threshold values and an output is generated based on the result of the comparison.

BRIEF DESCRIPTION OF THE DRAWINGS

The accompanying drawings, which are incorporated in and constitute a part of the specification, illustrate various embodiments of the present invention and, together with the general description given above and the detailed description provided below, serve to explain the principles of the invention.

DETAILED DESCRIPTION OF THE INVENTION

Figure 1:
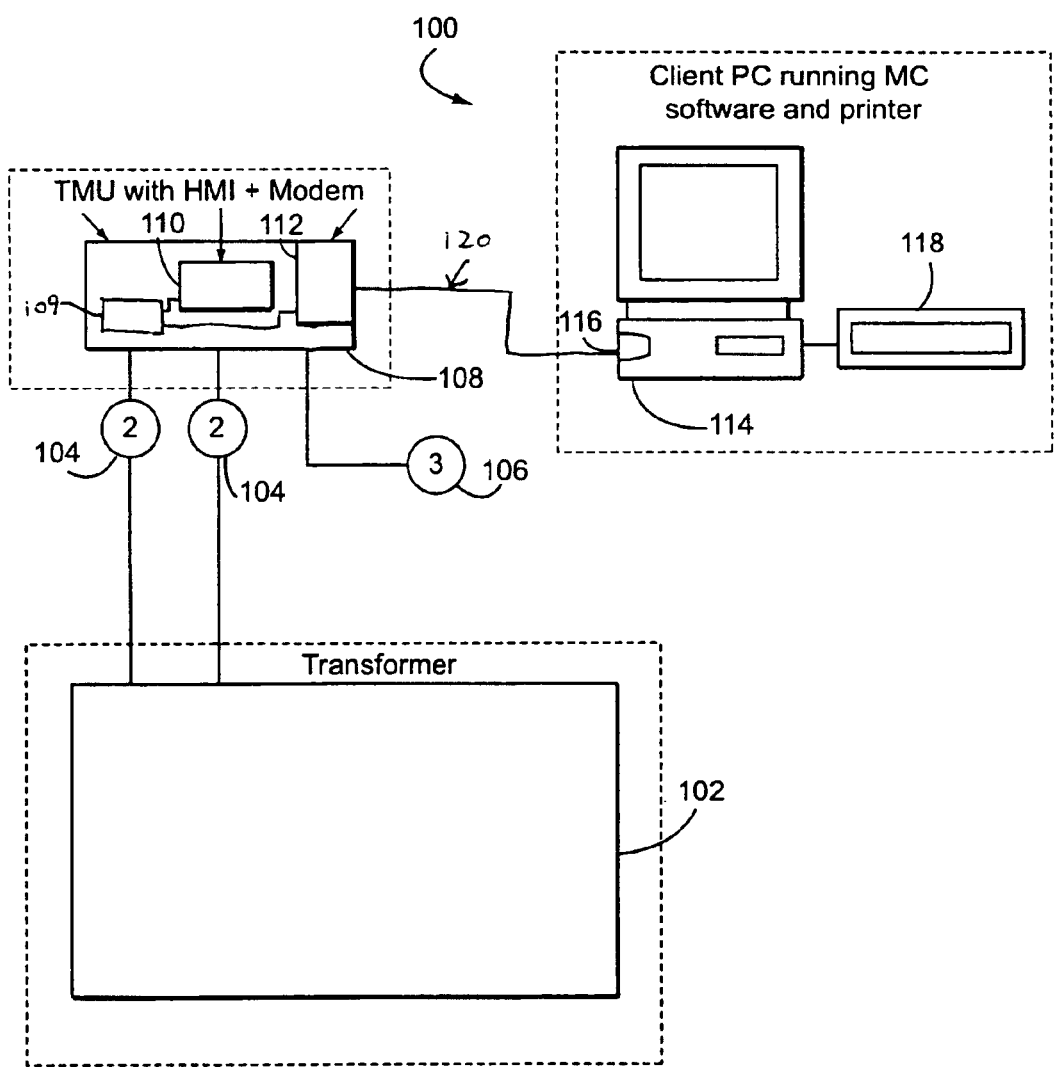
FIG. 1 is a block diagram of an example transformer management system.

The transformer management system described herein manages the overall performance and remaining life of transformers such as medium and small liquid-filled transformers used by electric utilities and industrials. The system includes a unit that is adaptable for permanent installation on or close to a particular transformer and is operable to monitor parameters of this single transformer. The unit is also adaptable to provide control (e.g., cooling system control) of the transformer. The unit may be part of a substation or part of a plant-wide, multi-unit network system that provides information to a central control system or a distributed control system. Through the collection, archiving, processing, analysis and interpretation of the data automatically monitored, the unit can provide information required to manage the operational life and improve the performance of a transformer. The data collected and archived, as well as the diagnostics and recommendations resulting from data interpretation, are available to end users at locations provided with processing systems (e.g., mainframe computers, personal computers, laptop computers, notebook computers, personal digital assistants, etc.) running remote management software.

In other embodiments, a single unit may be operable to monitor parameters of multiple transformers.

As is known, real situations in the physical and biological world, whether natural or involving technology and human intervention, are subject to analysis by modeling if they can be described in terms of mathematical equations. Various models are known for modeling the behavior of transformers and many are defined by standard-setting groups such as IEEE and the IEC. For example, the IEEE Guide for Loading Mineral-Oil-Immersed Transformers, C57.91-1995, the contents of which are incorporated herein, provides general recommendations for loading 65 C rise mineral-oil-immersed distribution and power transformers. The systems and methods described herein use sensed physical quantities as inputs to mathematical models for representing behavior of a transformer. Calculated model values are compared to threshold values and an output is generated based on the result of the comparison. The particular models mentioned below are merely examples of the models into which sensed physical parameters may be input and the details of the models do not constitute part of the present invention.

The systems and methods described herein continuously monitor a number of instruments or sensors that are mounted on or inside a transformer. Other sensors or instruments not mounted on or inside the transformer (e.g., a sensor for ambient temperature) may be monitored as desired. This information is then used by a processing system (e.g., a programmable logic circuit or a microprocessor-based system) that models the transformer behavior to manage and improve the transformer's performance and life.

The transformer management unit may be used as part of a global transformer substation monitoring system, or as a fully autonomous transformer monitoring unit controlled locally via an optional, built-in local control station. More specifically, a local, built-in interface (e.g., a human/machine interface (HMI)) unit may be provided for a stand-alone transformer management unit to provide access to the unit and controls without the need for a portable computer or modem connection. The HMI may include conventional input and output devices such as a display (e.g., CRT or LCD), a keypad, a pointing device, and the like. The HMI could also include a touch-sensitive screen. A port (e.g., an RS-232 port) is provided to connect the HMI on the programmable logic controller (PLC). Modem or network communication may be provided as an optional feature when the unit is not used as an autonomous unit equipment controlled only from a local display.

FIG. 1 is a block diagram showing an example system 100 that provides for management of a transformer. System 100 includes sensors 104 mounted on transformer 102; other sensors 106 not mounted on transformer 102; a transformer management unit (TMU) 108 including processing circuitry 109, an optional user (human/machine) interface 110, and an optional communication circuit 112 (e.g., modem, network interface); and a client processing system 114 (e.g., mainframe computer, personal computer, laptop computer, notebook computer, personal digital assistant, etc.) running remote management and control (MC) software. Client processing system 114 includes a communication circuit 116 and is connected to an associated printer 118.

Transformer 102 may be any transformer used by electric utilities and industrials and may, for example, be a medium or small liquid-filled transformer. The sensors 104 and 106 sense physical quantities associated with the operation of a transformer. The sensors used are of course dependent on the particular implementation. For example, some of these sensors sense transformer operating parameters (e.g., load current, top oil temperature, main tank temperature, on-load tap changer (OLTC) temperature, tap position). Other sensors sense parameters such as ambient temperature. These sensors may take a variety of conventional forms including temperature sensors, current transmitters, power transmitters and the like. One particular example sensor is an AQUAOIL™ 300 sensor for on-line monitoring of the relative humidity in oil and its changes during load variation. AQUAOIL™ is a trademark of GE Syprotec Inc. In some cases, the sensors may be coupled to signal transmitters (not shown in FIG. 1). An example signal transmitter is the HYDRAN® 201Ti transmitter. HYDRAN® is a registered trademark of GE Syprotec Inc. The HYDRAN® 201Ti continuous on-line intelligent transmitter is a small, cylindrical, thermally controlled enclosure that attaches to a valve on the transformer to be monitored. For example, the HYDRAN® 201Ri fault monitor system may be used as one of sensors 104. The HYDRAN® 201Ri system is an intelligent fault monitor system that reads a composite value of gases, in ppm, generated by faults and provides output capability for communications. The HYDRAN® 201Ri system may be connected to the HYDRAN® 201Ti transmitter and the HYDRAN® 201Ti transmitter may transmit the read composite values of gases to TMU 108. Of course, these particular arrangements are provided by way of illustration, not limitation and it will be apparent to those skilled in the art that sensors of many different types may be suitably arranged to provide appropriate data to TMU 108.

Example TMU 108 is preferably field-installable on the transformer tank wall or on a nearby support structure. TMU 108 is also preferably adapted (e.g., insulation/no insulation) for the requirements of the environment in which it will be positioned. For example, a "standard" TMU may be used in an environment in which the ambient temperature ranges from about −40 to +45 degrees C. and a "hot country" TMU may be used in an environment in which the ambient temperature ranges from 0 to +60 degrees C. The enclosure of TMU 108 is preferably designed and assembled to meet the Electrical Code requirements as defined for electrical substation equipment practice. The enclosure, when fully assembled, wired and operational, also preferably meets the NEMA 4 requirements (waterproof) when installed.

Figure 2:
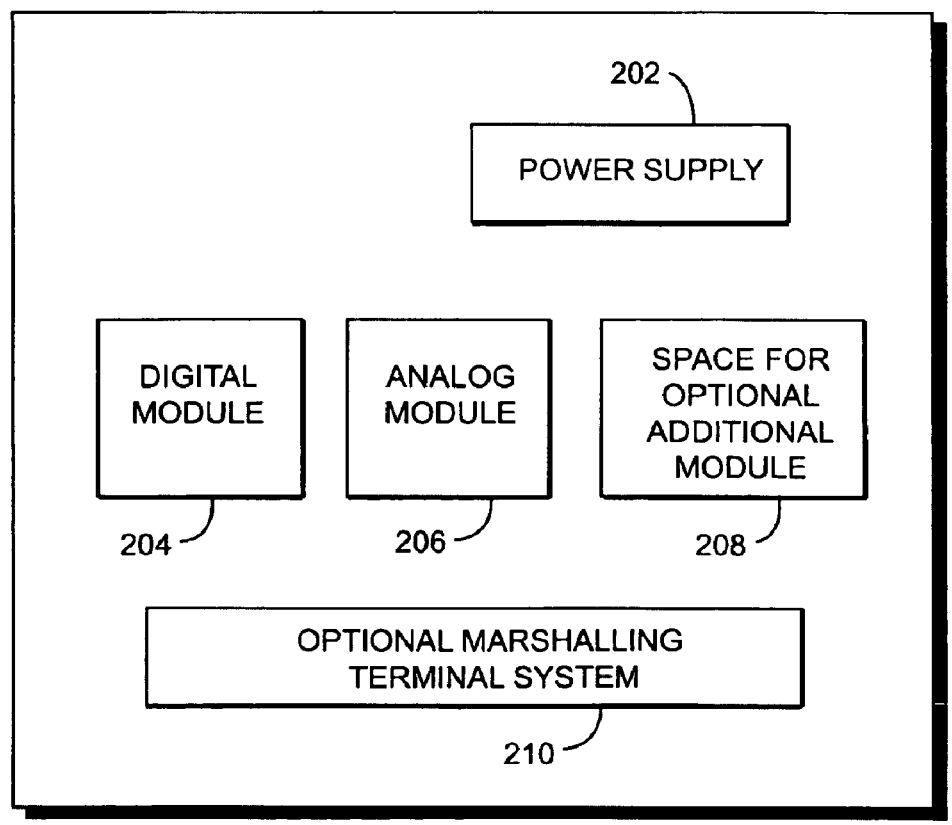
FIG. 2 is a cabinet layout for the transformer management system of FIG. 1.

FIG. 2 shows an illustrative cabinet layout for example TMU 108. The layout includes a power supply 202, a digital module 204, an analog module 206, a space 208 for an additional (optional) module and an optional marshalling terminal system 210. The cabinet size may be about 60×60× 28 cm. The cabinet may be designed for wall mounting or transformer mounting. In either case, the cabinet is also preferably designed for physical installation that is clear of any transformer cooling air flow.

Processing circuitry 109 of TMU 108 may be a programmable logic circuit (PLC) such as a PLC from the Momentum product family available from Modicon Inc. Of course, the processing circuitry may be implemented using other types of circuits capable of handling alarms, models, short-term data storage and communication. Such circuits include, but are not limited to, logic circuits, microprocessors, application specific integrated circuits (ASICs) and combinations thereof. These circuits should contain, or be supplemented with, memory sufficient to handle the TMU functions. By way of example, the memory can be sufficient to at least retain at least the last 7 days of selected readings and output values with a one per hour sampling rate. As the available technology progresses, it would be desirable to reach a target of one sample every 15 minutes and historical data storage of one week or more of so-sampled data. If the TMU is appropriately configured, long-term data and historical data may be stored through a communication network 120 (such as a Modbus Plus network or an Ethernet TCP/IP network)

to a central data storage system or to software running on a client processing system such as client processing system 114. Modbus Plus refers to a local area network system designed for industrial control applications. Of course other communication networks such as Intranets, radio frequency links, facsimile, pager, protocol data unit, and telephone links may be used.

All basic digital inputs and outputs of the example TMU 108 are rated for non-isolated 24 V d.c. operation. Any other voltage and isolation level and specific spike protection level may be by provided by isolation modules. Analog inputs of the example TMU 108 are rated for 4–20 mA signals non-isolated. Isolated inputs or other signals may be made available using isolation modules on the signal loop. Other optional input modules for the example TMU 108 may include an 8-channel 4–20 mA differential input; 4 channel mV, RTD, TC type input module; and a high-speed peak and hold input module. Optionally, a d.c.-rated digital output system may be interconnected to local alarm indicators and reporting system. In this option, the contacts should be dry or static and rated for 200 V d.c., 1-A signal, externally powered.

The following inputs/outputs are provided for the example TMU 108:

EXAMPLE INPUTS/OUTPUTS FOR TMU 108

|  | I/O Quantity |
|---|---|
| 4–20 mA Current Input common mode | 16 |
| 4–20 mA Current Outputs | 0 |
| 24 V d.c. Digital Inputs common supply | 16 |
| 24 V d.c. (relay) digital outputs | 16 |

As required by the intended application, the total number of inputs/outputs of the example TMU 108 is extendable by adding one module inside the cabinet shown in FIG. 2 or by the addition of extension cabinets with a maximum of three I/O modules per cabinet.

In the example TMU 108, the digital inputs may be assigned as follows:

EXAMPLE DIGITAL INPUTS FOR TMU 108

| | Assignment of Digital Inputs |
|---|---|
| 1 | HYDRAN ® HHA alarm switch (HHA = high high alarm) |
| 2 | HYDRAN ® HA alarm switch (HA = high alarm) |
| 3 | HYDRAN ® Fail alarm switch |
| 4 | Conservator liquid level or main tank liquid level |
| 5 | Pressure/vacuum (pressure/relay) |
| 6 | Sudden pressure from the Bucholz or sudden pressure relay |
| 7 | Gas accumulation (Bucholz relay) |
| 8 | Pressure relief device relay |
| 9 | Loss of auxiliary power on transformer (Volts Input) |
| 10 | Cooling stage 2 "ON" auxiliary contact |
| 11 | Cooling stage 3 "ON" auxiliary contact |
| 12 | — |
| 13 | — |
| 14 | — |
| 15 | — |
| 16 | — |

In the example system, all inputs have pre-assigned usage and structure. Each input handles and reports information related to a specific physical parameter, such as limit switch position, pressure or level switch status, etc. Depending on the configuration of the system, each input status may be read from the TMU hardware input or received through a network in which the TMU is connected. Also depending on the configuration of the system, each input value may be read from an automatic source (hardware input or network) or manually forced to an ON or OFF status.

In the example TMU 108, the digital outputs may be assigned as follows:

EXAMPLE DIGITAL OUTPUTS FOR TMU 108

| | Assignment of Digital Outputs |
|---|---|
| 1 | HYDRAN ® HHA Alarm |
| 2 | HYDRAN ® HA alarm |
| 3 | HYDRAN ® Fail alarm |
| 4 | Top oil alarm |
| 5 | Hot-spot alarm |
| 6 | Liquid level alarm |
| 7 | Pressure/vacuum alarm |
| 8 | Sudden pressure alarm (Bucholz) |
| 9 | Gas accumulation alarm (Bucholz) |
| 10 | Pressure relief device alarm |
| 11 | Cooling alarm |
| 12 | OLTC temp. diff. alarm |
| 13 | Common alarm |
| 14 | System watch dog |
| 15 | Cooling stage 2 control |
| 16 | Cooling stage 3 control |

In the example TMU 108, the analog inputs may be assigned as follows:

EXAMPLE ANALOG INPUTS FOR TMU 108

| | Assignment of Analog Inputs |
|---|---|
| 1 | HYDRAN ® 4–20 mA |
| 2 | AQUAOIL ™ 4–20 mA temperature |
| 3 | AQUAOIL ™ 4–20 mA moisture |
| 4 | Top oil temperature 4–20 mA |
| 5 | Outside 4–20 mA ambient temperature |
| 6 | Load current 4–20 mA (Phase A) |
| 7 | Load current 4–20 mA (Phase B) |
| 8 | Load current 4–20 mA (Phase C) |
| 9 | Load volts 4–20 mA |
| 10 | OLTO tank temperature 4–20 mA |
| 11 | OLTO tap position 4–20 mA |
| 12 | — |
| 13 | — |
| 14 | — |
| 15 | — |
| 16 | — |

In the example system, these inputs have pre-assigned usage and structure. Each handles and reports information related to a specific physical parameter, such as voltage, current, gas concentration, etc. All signals related to a specific type of input such as temperature, concentration, etc. have the same engineering units, which are typically non-configurable and attached to the process assigned to each input. For example, the units for concentration may be ppm, the units for moisture may be % RH, the units for load current may be A, the units for load voltage may be V, etc. All inputs have the same configuration structure. Depending on the system configuration, each input value may be read from the TMU hardware input or received through a network in which the TMU is connected. Also depending on the configuration of the system, each input measured value may be read from an automatic source (hardware input or network) or manually keep the last automatically read value. In this manual mode, when required, the operator may manually modify the measured value.

Power supply 202 provides for standard 115 V a.c.±10%, or 230 V a.c.±10%, 50 or 60 Hz, phase-to-neutral supply. An optional feature allows a user to choose a supply from a d.c. source (48 or 129V), usually at the station battery site. The typical electrical load is approximately 250 VA.

The transformer management system includes basic software embedded on TMU 108 and the MC software. If the example TMU 108 is reporting to a central supervisory control and data acquisition (SCADA), distributed control system (DCS) or equivalent central supervisory system, only the embedded software is used. When remote consultation of TMU 108 is desired, the MC software is used. The MC software may, for example, run on client processing system 114 (e.g., a personal computer with a Windows® 95, 98 or NT operating system).

The embedded software is embedded on the PLC of TMU 108 and provides data acquisition, data treatment and model computation, data storage and data transfer to client processing system 114. Data is acquired by the PLC at a predetermined scan rate (e.g., approximately 150 ms). Historical data is stored periodically for selected inputs, outputs and model computation outputs (e.g., every hour). At the PLC level, the historical selected data storage is limited (e.g., to a period of one day). Depending on configuration, all input/output data is continuously available through a network to the MC application, SCADA or DCS. Depending on the configuration, each input status (digital) or value (analog) may be read from the PLC hardware or received through the network. Depending on operator selection, each input value (digital and analog) may be overridden by a manually forced value. All input/output signal treatment and model computations are done by the PLC embedded software. The model computation processes are discussed in greater detail below.

Digital input/output data is treated by the PLC on a real-time basis and analog input data is treated every second. Model computations are done in accordance with schedule associated with each model. For example, an aging model computation may be performed once a day, while a cooling efficiency model computation may be performed once an hour. Specific data related to a particular transformer is resident on the PLC. Preferably, only the data required to execute the model computations, the alarm system, the trip system and the cooling system control are stored in PLC memory.

In those cases in which TMU 108 is incorporated in a network, all measured values and model computation results are available through a network to "higher-level" data collection and handling systems (e.g., SCADA, DCS or MC). Optionally, the data may be available by providing a connection for TMU 108 to the Internet. The data transfer scheduling may be initiated and controlled by the higher-level data collection and handling systems, although the systems and methods of the present invention are not limited in this respect. The user can configure the data collection sampling time base depending on system requirements and network capability. Alternatively, the data collection and sampling time base may be determined automatically by the higher-level data collection and handling system.

Embedded Software Functions

The embedded PLC software can perform the following functions:

System Initialization and Management—system initialization includes the writing and updating of constants used by the system. It also includes the generation of all flags and triggers used to synchronize the execution of different functions and models. The data collection received from the network is validated. The date and time data is generated and synchronized with the network date and time if these data are available on the network.

Digital Inputs Read Validation and Alarming—the digital read validation and alarming handles the incoming status of each digital signal depending on the configuration. Depending on the input configuration, after this validation, the alarming and time tag function is executed.

Analog Inputs Read Validation and Alarming—the analog input read validation and alarming handles the incoming status of each analog signal depending on the configuration. Depending on the input configuration, after this validation, the alarming and time tag function is executed.

Model Computations and Alarming—Each model is executed and a signal output and alarming function is generated and executed depending on each model configuration. A general model description is set forth below.

Digital Output Writing—the digital output executes the command function generated by the alarming or control functions. The digital output controls the PLC hardware outputs.

Local HMI—the local HMI allows complete configuration, monitoring, and control of the TMU. It permits the system to be used in an environment without telephone or network communications. In this situation, the system operates as a self-contained protection device monitoring the transformer status depending on the protection strategy.

Client Application Interface—an interface that allows a remote user to obtain TMU data from anywhere in the world. Through LAN, WAN or telephone link, a user is able to configure, monitor, analyze and diagnose transformer status. The software also generates alarm reports and stores historical data of monitored transformers.

Alarm Management System—the alarm management system monitors the alarms of the digital outputs and model outputs. In case of raised alarm condition, it raises an alarm flag to be read by the MC software or the supervisory system on the network.

Security System—the security system at the PLC level authorizes a configuration change if an appropriate password is provided. Changes to the PLC program are possible only if the technician/engineer has access to the original source code. The security level at the MC software provides two levels of authorization: the operator level, which may access all functions except the configuration functionality; and the supervisor level, which may access all functionality available on the system.

Communication System Management—the communication system allows configuration of the network information, modem and Internet parameters. The system also preferably provides built-in capabilities for PLC program diagnostics, program modifications and program upload or download. This functionality may be executed using Schneider Concept Software (version 2.1) through a modem or network link without any local site intervention.

The local HMI and/or the client application interface allow a user to configure the system. This configuration involves enabling or disabling certain models, inputting transformer data (e.g., single phase, three phase), transformers provided, and engineering units. The local HMI and/or the client application interface also provides a "command screen" that permits a user to input alarm acknowledgements, to reset values, etc.

Models

The embedded PLC software computes models that model various aspects of transformer operation. As mentioned above, these models are merely examples of the models into which sensed physical parameters may be input and the details of the models do not constitute part of the present invention.

All analog inputs are measured every second and averaged. A one-minute average is first computed and, in a second step, a one-hour average is computed. These are non-rolling averages. Both values remain available for further calculations until refreshed by a new value.

Load Current Model

A Load Current model computes load value for each phase equipped with a current transformer. Depending on the configuration, the Load Current model is computed for a single-phase or three-phase transformer. If the transformer is three-phase and equipped with three current transformers, the load current may be defined as the highest minute average of all three currents. This comparison is made every minute from the minute-averaged load current value.

A Load Current model typically can use the following inputs:

From configuration:
  model enable or disable,
  transformer type (single-phase or three-phase),
  one or three current transformers provided (which may, if desired, be automatically configured as one in the case of a single-phase transformer), and
  the engineering unit to be used.
Command from MC screen:
  the reset of the maximum value for each computed value
From analog input validation and averaging function:
  the phase A minute-averaged load current,
  the phase B minute-averaged load current, and
  the phase C minute-averaged load current.

A Load Current model generates the following information:
  the average load current (A), one or three values, and
  the highest minute-averaged load current (A) with time tag.

The information generated by the Load Current model may be compared with user-configurable thresholds or set-points to generate, for example, warnings or alarms.

MVA Model

An MVA model computes the apparent power value. Depending on the configuration, the MVA model is computed for a single-phase or three-phase transformer. The computation in the example TMU 108 may use a standard MVA computation formula such as may be found in the American Electrician's Handbook, McGraw-Hill, Thirteenth Edition, 1996, #1.146 and 1.152.

An MVA model typically can use the following inputs:
  From configuration:
    model enable or disable,
    transformer type, single-phase or three-phase,
    one or three current transformers provided (which may, if desired, be automatically configured as one in the case of a single-phase transformer), and
    the engineering unit to be used.
  Command from MC screen:
    the reset of the maximum value for each computed value
  From analog input validation and averaging function:
    the phase A minute-averaged load current,
    the phase B minute-averaged load current,
    the phase C minute-averaged load current, and
    the minute-averaged load voltage.

The MVA model generates the following information:
  the MVA load, and
  the maximum MVA load with time tag.

The current signals are typically required, but a fixed value may be used for the load voltage.

The information generated by the MVA model may be compared with user-configurable thresholds or set-points to generate, for example, warnings or alarms.

Winding Hot-Spot Temperature Model

A Winding Hot-Spot Temperature model monitors the winding hot-spot temperature on each phase winding. In the case of a single-phase transformer, the Winding Hot-Spot Temperature model gives the computed winding hot-spot value. In the case of a three-phase transformer, the Winding Hot-Spot Temperature model gives the highest values of the computed values on each of the three transformer windings. The computed winding hot-spot temperature value is hourly-averaged (to be used by other models). If the minute-averaged winding hot-spot temperature exceeds a first set-point value, a "High" alarm is generated. If the minute-averaged winding hot-spot temperature exceeds a second set-point value, a trip command ("High High" alarm) is generated. The computation in the example TMU 108 may be based on IEEE standard C57.91-1995 (IEEE "Guide for Loading Mineral-Oil Immersed Transformers"), IEC Standard 354, "Loading Guide for Oil-Immersed Power Transformers").

A Winding Hot-Spot Temperature model typically can use the following inputs:

From configuration:
model enable or disable,
transformer type, single-phase or three-phase,
the transformer rated hot spot temperature rise above top-oil,
the rated maximum load current $I_R$,
the winding exponent m,
the high alarm set-point temperature,
the trip command set-point temperature, and
the high alarm and trip command set-point dead band.
Command from MC screen:
the alarm acknowledge
From measured values:
the phase A minute-averaged load current,
the phase B minute-averaged load current,
the phase C minute-averaged load current, and
the minute-averaged top oil temperature.

For a single-phase transformer or single current transformer application, the Winding Hot-Spot Temperature model generates once a minute the following information:
  the winding hot spot temperature.

For a three-phase transformer with three current transformers, the Winding Hot-Spot Temperature model generates once a minute the following information:

the hot-spot temperature for the phase A winding, the hot spot temperature for the phase B winding, and the hot spot temperature for the phase C winding.

The Winding Hot-Spot Temperature model generates the following additional information for both single-phase and three-phase transformers:

alarm status with time tag if alarm is raised, alarm acknowledge with time tag, trip command with time tag, trip acknowledge with time tag, and hourly-averaged highest winding hot spot temperature.

Thus, the information generated by the Winding Hot Spot Temperature model may be compared with user-configurable thresholds or set-points to generate, for example, warnings, alarms, or trip signals.

Insulation Aging Model

An Insulation Aging model computes for a set time period (e.g., every hour) of transformer usage the equivalent aging of the transformer evaluated in hours of transformer lifetime usage at rated conditions. The computation in the example TMU 108 may be based on IEEE C57.91-1995.

An Insulation Aging model typically can use the following inputs:

From configuration:

model enable or disable, and usage counted from system running time or from transformer energized signal.

From measured value:

the previously computed hourly-averaged highest winding hot-spot temperature.

The Insulation Aging model generates the following information:

the aging thermal acceleration factor, the daily aging rate, and the cumulative aging.

It is noted that the Insulation Aging model uses the hourly-averaged highest winding hot spot temperature computed using the Winding Hot Spot model.

Cooling System Status Model

A Cooling System Status model provides Stage 2 and Stage 3 cooling system control following variation of the winding hot spot temperature, the top oil temperature and the transformer load. Example TMU 108 controls two cooling stages (2 and 3). For each stage, TMU 108 triggers the system cooling stage ON when one or more of the controlling values reaches the set-point and when an appropriate timing is completed. The cooling system is controlled by three sets of measured values:

the highest minute-averaged winding hot spot temperature (highest computed from measured current on phases A, B, C), the highest minute-averaged top oil temperature, and the highest minute-averaged transformer load (highest of the phases A, B, C current).

The user configures each set of values as Enable or Disable if the user wants to use or unuse the associated cooling system commands. The cooling system stages triggers OFF when all measured values have reached a value below the set-point threshold and status is confirmed with appropriate timing.

Cooling Efficiency Model

A Cooling Efficiency model computes the theoretical top oil temperature and compares it with the actual top oil temperature. If the difference between these two temperatures exceeds a set-point, an alarm is generated. The model is executed, for example, every hour. The computation in the example TMU 108 can be based on the IEEE Standard C57.91-1995 ("IEEE Guide for Loading Mineral-Oil Immersed Transformers").

A Cooling Efficiency Model typically can use the following inputs:

From configuration:

model enable or disable, the rated load current $I_R$, the rated top oil temperature rise, rated load losses $P_{LR}$, rated no-load losses $P_{CR}$, oil exponent n, related top oil time constant $T_{TOR}$, the cooling system alarm set-point, and the cooling system alarm dead band.

Command from MC screen:

the alarm acknowledge command.

From measured value:

the hourly-averaged phase A load current, the hourly-averaged phase B load current, the hourly-averaged phase C load current, the hourly-averaged top oil temperature, and the hourly-averaged ambient temperature.

The Cooling Efficiency model may generate the following information:

alarm if the difference between actual top oil temperature and the theoretical computed top oil temperature exceeds the set-point, and the alarm acknowledge with time tag.

OLTC Temperature Model

The OLTC Temperature model compares the main tank temperature (top oil) with the OLTC tank temperature. If the averaged temperature difference exceeds a first set-point, an alarm is generated. If the averaged temperature difference exceeds a second set-point, a trip command is generated.

An OLTC Temperature model typically can use the following inputs:

From configuration:

model enable or disable, the temperature alarm set-point, the temperature trip set-point, and the temperature set-point dead band.

Command from MC screen:

the alarm acknowledge, and the trip acknowledge.

From measured value:

the main tank temperature (top oil), and the OLTC tank temperature.

The OLTC Temperature model may generate the following information:

the value of the 24-hour average temperature difference, alarm status with time tag if alarm is raised, alarm acknowledge with time tag, trip command with time tag, and trip acknowledge with time tag.

OLTC Tap Position Tracking Model

Following a sensor drive by the OLTC tap actuator, the actual tap position is determined and recorded. The quantity of transitions on each position is recorded on two sets of data. The first set of data is not modifiable by the user (permanent accumulated count of operation), while the second set may be reset to zero count by the user (accumulated count of operation from last count reset done by operator). The last reset time and data is recorded. If for any reason two successive recorded transitions are not adjacent, the system preferably automatically increases the count of the intermediate position(s).

An OLTC Tap Position Tracking model typically can use the following inputs:

From configuration:

model enable or disable, and number of tap positions.

From command screen:

the reset of the transition count for each position.

From the measured value:

the tap tracking position.

The OLTC Tap Position Tracking model may generate the following information:

the value of the non-resettable transition count for each position, and the value of the resettable transition count for each position.

Custom Display Model

In the example system, a Custom Display model is provided by the MC software. A custom screen displays dial and trend of a maximum of six values. These values may include any mix of digital inputs, digital outputs, analog inputs or model outputs.

Moisture Saturation in Oil Model

A Moisture Saturation in Oil model converts the moisture-in-oil relative humidity value to an absolute value in ppm. The computation in the example TMU 108 can be based on IEEE Standard C57.91-1995 (IEEE Guide for Loading Mineral-Oil Immersed Transformers).

A Moisture Saturation in Oil Model typically can use the following inputs:

From configuration:

model enable or disable.

Command from MC screen:

none.

From other models:

winding hot-spot temperature.

From measured value:

oil temperature from AQUAOIL™ 300 sensor, and relative water content from AQUAOIL™ 300 sensor.

The Moisture Saturation in Oil model may generate the following information:

absolute water content in oil (ppm).

Moisture in Paper

A Moisture in Paper model calculates the percentage moisture in paper from the moisture in oil. This model is activated only when the winding hot-spot temperature exceeds 80 degrees C. If the temperature is below 80 degrees C., a warning signal such as "Moisture not available, transformer too cold" is provided. This model requires computation of the Moisture Saturation in Oil model. The computation in the example TMU 108 is based on IEEE Standard 57.91-1995.

A Moisture in Paper Model typically can use the following inputs:

From configuration model enable or disable.

Command from MC screen none.

From other models:

winding hot-spot temperature, and moving average relative humidity (%) from the AQUAOIL™ 300 sensor.

From measured value:

oil temperature from the AQUAOIL™ 300 sensor, and relative water content from the AQUAOIL™ 300 sensor.

The Moisture in Paper model may generate the following information:

water content (%) of paper in the hot-spot area

Bubbling Model

A Bubbling model calculates the threshold critical temperature of bubble formation in the insulation. This value is deducted from the Moisture in Paper model. In the example TMU 108, this model requires the computation of the Moisture Saturation in Oil model and the Moisture in Paper model. The computation in the example TMU 108 can be based on IEEE Standard C57.91-1995 (IEEE Guide for Loading Mineral-Oil Immersed Transformers).

A Bubbling model typically can use the following inputs:

From configuration:

model enable or disable, and insulating oil type.

Command from MC screen:

none.

From measured value:

none.

From other models:

water content of paper in the hot-spot area.

The Bubbling model may generate the following information:

bubbling temperature

Water Condensation in Oil Model

In the case of a transformer cooling down, a Water Condensation in Oil model calculates the critical temperature when the moisture content in oil will lead to precipitation of free water in oil. The computation in the example TMU 108 can be based on IEEE Standard C57.91-1995 (IEEE Guide for Loading Mineral-Oil Immersed Transformers).

A Water Condensation in Oil model typically uses the following inputs:

From configuration:

model enable or disable.

Command from MC screen:

none.

From other models:

relative humidity from the AQUAOIL™ 300 sensor.

From measured value:

Oil temperature from the AQUAOIL 300™ sensor.

The Water Condensation in Oil model generates the following information:

temperature of condensation of water in oil

HYDRAN® Combined Combustible Gas Short-Term Trend

This model calculates the short-term rate of gas generation with any appropriate averaging function with the short-term trend period fixed at, for example, 24 hours.

HYDRAN® Combined Combustible Gas Long-Term Trend

The HYDRAN® Long-Term Trend Model calculates the long-term rate of gas generation with any appropriate averaging function, with the long-term trend period fixed at, for example, 30 days.

Off-Line DGA (Dissolved Gas-in-Oil Analysis) Model

An Off-Line DGA model works from manually input dissolved gas values previously determined by dissolved gas analyses done in laboratory. This model executes a dissolved gas diagnostic and generates recommendations in accordance with gas ratio computed from the manually input value of previously measured gas content in oil. This model generates a diagnostic of the DGA evolution of each transformer monitored by the MC software running on the client processing system. The computation in example TMU 108 can be based on IEEE 62-1995 "Guide for Diagnostic Field Testing of Electric Power Apparatus Part 1 Oil Filled Transformers, Regulators and Reactors"; IEC Standard 60599 "Mineral Oil-impregnated Electrical Equipment in Service Guide to the Interpretation of Dissolved and Free Gases Analysis".

The Off-Line DGA model provides:
- screen(s) to input the values given by the laboratory's dissolved gas analysis report,
- screen(s) to select the date and time period of diagnostic (used to retrieve historical data for the diagnostic),
- screen(s) to manage the acceptable user and IEEE gas limits, and
- screen(s) to display results in table form, trend form and histogram form.

Off-Line Oil Physical Test Model

An Off-Line Physical Test model based on IEEE standard C57.91-1995 works from manually input oil physical characteristics previously determined by oil analysis done in laboratory. This model generates an overall state of the insulating oil of each transformer monitored by the MC software running on the client processing system. The Off-Line Oil Physical Test model provides:
- screen(s) to input values given by the laboratory's oil analysis report,
- screen(s) to select the date and time period of diagnostic,
- screen(s) to manage the acceptable user and IEEE gas limits, and
- screen(s) to display results in table form, trend form, and histogram form.

Off-Line Predictive Loading Guide Model

An Off-Line Predictive Loading Guide model simulates the transformer behavior under overload condition and evaluates the thermal stress on insulation aging. This model works with transformer insulation and oil parameter manually introduced by the user. This parameter can also be read from a transformer database when such information is available.

The Off-Line Predictive Loading Guide model provides:
- screen(s) to introduce the simulated values such as outside ambient temperature, transformer loading (data input will cover a period of four weeks of simulation with a data input sampling of one set of data every thirty minutes),
- screen(s) to select the week and time period of result display,
- screen(s) to manage and introduce the required transformer insulation and oil constant parameters for simulation purpose, and
- screen(s) to display results in table form, trend form and histogram form.

System Operation

Figure 3:
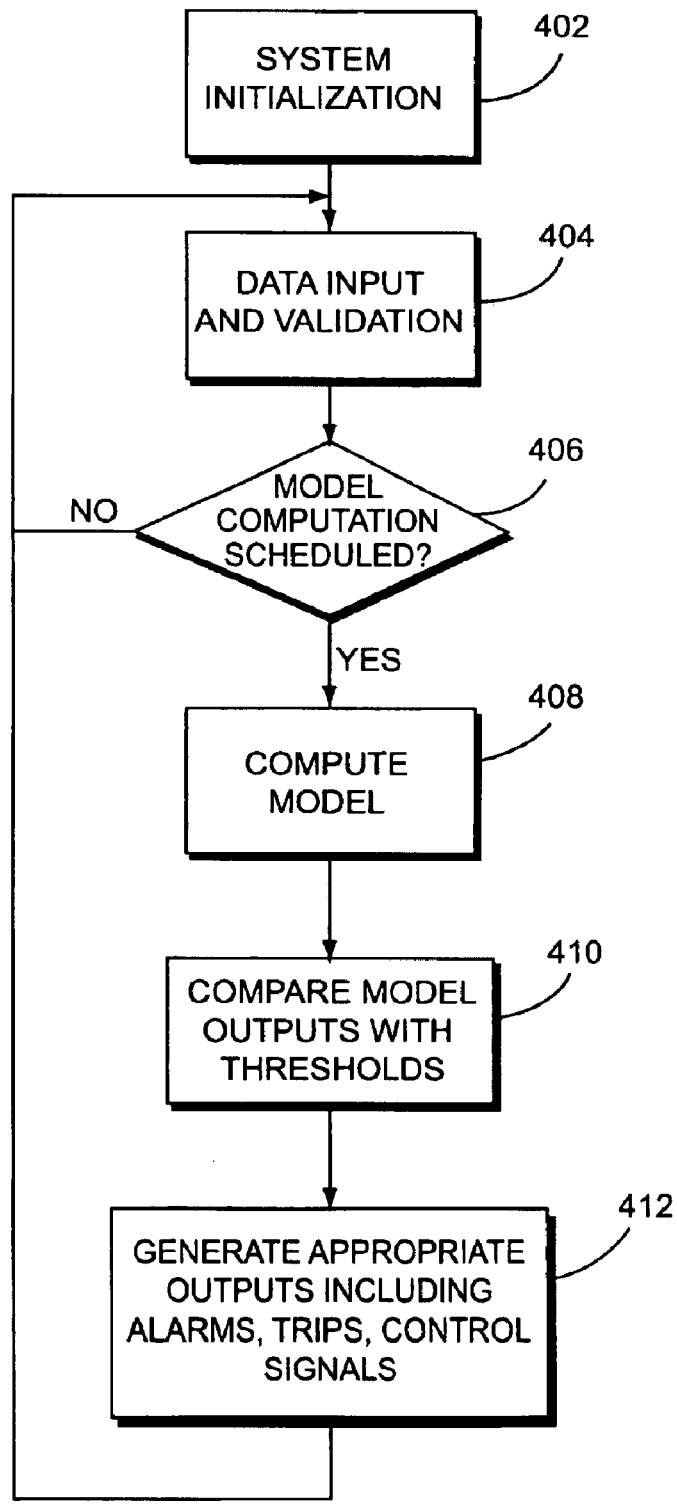
FIG. 3 is a flow chart illustrating the operation of the transformer management system.

FIG. 3 is a flowchart that illustrates the operation of the transformer management system. At block 402, the system is initialized. As noted above, this can include the writing and updating of the constants used by the system. It also includes the generation of all flags and triggers used to synchronize the execution of different functions and models. The data collection received from the network is validated. The date and time data is generated and synchronized with the network date and time if these data are available on the network. At block 404, sensor signals are input and validated. At step 406, a determination is made as to whether a model computation is scheduled. As noted above, model computations are done in accordance with schedule associated with each model. If a model computation is scheduled, the computation is performed at block 408. The model output signals are compared with threshold values or set points at block 410. Appropriate outputs are generated as a result of this comparison at block 412. These outputs include alarms, control signals, and the like. Control then returns to block 404.

MC Software

The MC software preferably satisfies the following communication requirements:
- provides access to single or networked TMU—the network protocol may, for example, be one of following: Modbus Plus; Modbus on TCP/IP; DNP3 and web-compatible
- provide access to single TMU through modem—provide access from single RS-232 port to TMU using MC software running on client processing system
- multiple TMUs—provide access through single RS-232 port or network to many TMUs connected to the same Modbus or other network
- broadcast information—provide means to send and receive common information such as time, volt value, ambient temperature, etc.
- dynamic data storage—dynamic data storage on the MC is done for real-time display or historical display purposes. Real-time data is stored on a temporary basis and is not permanently recorded on hard disk. Real time display is limited to all measured value inputs and model results. Only the last n (e.g., n=300) set of data is kept in memory. After n recordings, the newest data replaces the oldest in a roll-over fashion. The data is collected based on an operator-selected sampling period (e.g., once per five seconds, per 30 seconds, per minute, per five minutes, per 15 minutes, or per hour). After a sampling period change, all temporarily-stored real-time data is erased. The dynamic data is added and stored in databases and becomes historical data. The data transfer is limited to data available on the TMU memory and not already written in the memory of the client processing system. Static selected data (configuration and constant data) is transferred on demand, after data modification.

The data transfer is initiated by the calling device. In this configuration, the TMU operates as a slave unit in a master-slave system configuration. In both MC working modes of operation (on-line and off-line), when the client processing system is connected to the TMU or to the network, dynamic selected data is automatically transferred from the PLC (data registers) to the client processing system memory (e.g., hard disk) at a predetermined sampling rate.

A graphical user interface (GUI) allows the operator and supervisor to visualize status and value, read the diagnostics and recommendations and control the operation of the transformer management system. The GUI structure and functionality is described in detail below.

The MC software provides on-line and off-line modes of operation. In the on-line mode, the client processing system is connected to the TMU directly, through modem or network. As detailed below, the on-line mode of operation displays the actual real-time values of inputs/outputs and model computation results. This on-line mode is also used for system configuration. The on-line operation may, for example, be through the Modbus Plus network, through TCP/IP over Ethernet network, or through a modem connected on the PLC of the TMU. In all cases, the on-line operation gives the user access to all TMUs connected on the same network. The user may also execute other functions available with the off-line mode. The off-line mode may be used anytime—whether or not in communication with a TMU. As described below, the software uses previously downloaded data in the off-line working mode of operation. The off-line mode provides access to the historical data.

The MC software functionality and general system configuration are similar to those provided by the TMU software except that:

inputs and outputs are assigned permanently to specific functions—they do not need to be assigned, the specific constants required by the model are all addressed and configured on the Constant Screen, and all model computations are done in the PLC—the MC does not perform any model computation.

The provided functionalities are:

select the equipment to be reviewed and diagnosed, by selecting the connection route following the communication media chosen—the telephone number for modem-type link; the TCP/IP address for Ethernet media; and the network number and node number for the Modbus Plus network, select and display the data related to a specific TMU, propose diagnostic and recommendations based on available data, print reports, and export data.

The MC GUI provides access to two types of data: static data and dynamic data. Static data includes information required for configuration of the TMU and the MC parameters. Dynamic data includes all measured or calculated values available from the TMU. Dynamic data includes two sets of data: real-time data for a real-time display mode and historical data for a historical display mode. In the real-time display mode, the client processing system must be connected continuously to the TMU. Some screens display real-time data read in the on-line working mode at a pre-selected sampling rate. Other screens use temporarily stored real-time data. Still other screens display historical use data already stored in the client processing system. At the beginning of a display session, the user selects: a data source (real-time or historical data); for real-time data, the data sampling rate; and for historical data, the data and period duration of the data review.

GUI

The GUI provides for various interactions between users and the transformer management system. It will be apparent that the GUI may take many forms and the present invention is not limited in this respect. In what follows, various considerations for a GUI are described with a view toward providing a GUI that enables implementation of the transformer management system as described herein.

Display dials of measured or computed values will be described below. Generally speaking, in an example display:

each screen may have a maximum of six dials, one digital trend area, one analog trend area when used, and one comment/recommendation area, the mix of digital and analog dials may be selected depending on the model displayed on the screen—unused dial areas may be used to select display of any mix of additional digital or analog values, the trends may display a maximum of six analog and digital values per trending area, and date and time display may follow the Year-Month-Day-Hours-Minute-Second format.

Figure 4:
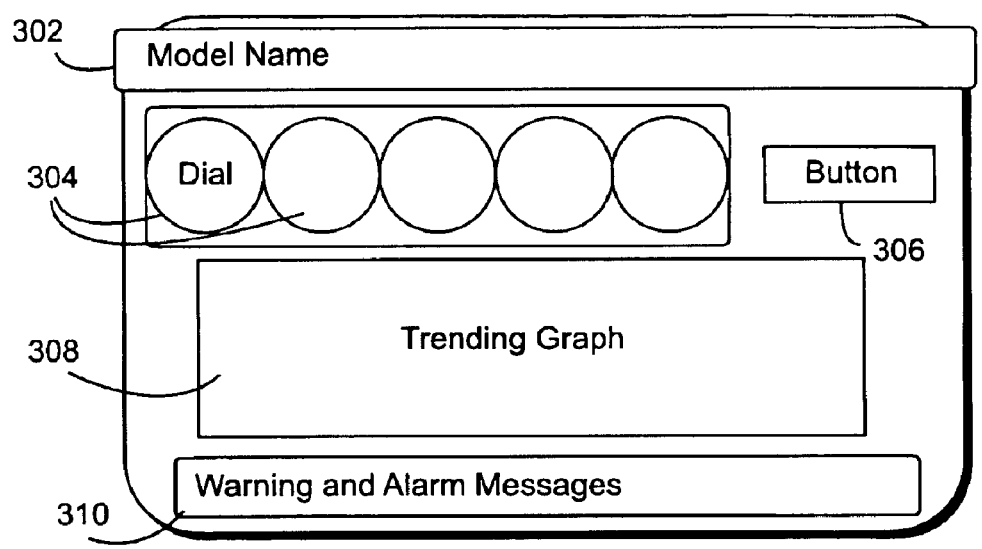
FIG. 4 shows a generalized example display structure.

FIG. 4 shows an example display structure that includes a model name identifier 302, dials 304, button 306, trending graph 308 and message area 310. The positioning and number of the various components of FIG. 4 are by way of example, not limitation. It will be apparent that some display screens will include some, but not all, of these components and that these elements may be easily rearranged. For example, button 306 may in fact be more than one button for initiating various actions (e.g., close screen, choose other values to display, and the like) and these buttons may be positioned so as to provide an intuitive, user-friendly interface. Message area 310 may contain messages regarding alarms, warnings or model schedules.

Each of the dials 304 may be configured as follows: automatic mode: circular dial over a gray background; manual mode: vertical bar chart over a gray background; and sensor fault status: the dial background color becomes white.

Each dial may display the following data: the name (tag) of the measured or calculated value; a graduated dial with the minimum or maximum value as per the minimum and maximum values used on the input scaling function; a needle showing the value corresponding to the trend graph cursor value; the numeric value with decimal point when required, showing the value at the trend graph cursor position; the high alarm area as per the configured high alarm set-point; the trip (High High) alarm area as per the configured trip (High High alarm) set-point limit; and the engineering units.

An example trend display may have the following characteristics: each trend area may display a maximum of six analog or digital values corresponding to the values shown on the dials; the digital trend area is separate from the analog trend area; each value is characterized by a color mark similar to the color mark shown on the corresponding dial; each value may be enabled or disabled and the corresponding trace will be visible or hidden; vertical scale of each trace may be user-adjustable—the adjustment may be done by action on the value scale or by window zooming made on the trend area; and time scale may be user-adjustable—this adjustment may be done by action on the time scale or by window zooming made on the trend area.

A table format display screen gives all information related to digital inputs, analog inputs, or their configuration parameters. The configuration data is typically (although not limited to) modification by the supervisor. The control data is typically modifiable by the supervisor and the operator. These controls may include: manual/auto selection; write manual status or value; acknowledge alarm; miscellaneous reset command; and cooling mode and operation.

A real-time data display screen may have the following characteristics: in the on-line mode, the user may select real-time or historical display; in real-time mode, the analog value trend is updated at a pre-selected sampling rate; if raised between sampling times, alarm-related values may also be displayed; the trend may show only the last n (e.g., n=300) sampled data; dial may show the value related to the real-time value if located on the extreme left of the trend, or the past value shown on trend at the cursor location; in real-time mode, the screen refresh function may be automatically performed after each data sampling or following an operator refresh command; and the screen may have a control to start or stop the data collection (the default value is "run").

Maintenance screens may be in table form and include: configuration screen(s); constant values input screen(s); digital I/O control screen(s); analog I/O control screen(s); model enable/disable control screen(s); security system management screen(s); and communication management screen(s).

The real-time display screens may include: real-time measured-value display screen(s) with dial and trend for each value such as digital, analog values and model output values; maximum value control screen(s) with time tag (in table form); alarm output status screen(s) with time tag with reset command and reset command status with time tag (in table form); system control screen(s) such as PLC diagnostic status; cooling system control screen(s), to provide control function required for the cooling system manual/automatic operation; and load profile display screen(s).

The historical display screens may include: historical digital inputs status; historical value of analog inputs; historical alarms screen; combined analog and digital values screens for each model; and combination of custom-selected analog and/or digital measured or computed values.

The utilities display screens may include: data export screen; and report generation screens.

With configuration screen(s), the operator can: introduce parameters related to the PLC structure and operation; set the PLC date and time; and set a miscellaneous timing function value.

With constant value input screen(s), the operator can: set the constants related to the transformer characteristics; set the constants related to the insulating oil; and set the constants related to the transformer accessories.

Digital input control screen gives in table form the following commands: select data source (hardware/network); select Auto/Manual working mode; select status of the manual command (ON/OFF); select direct (value "1" is seen as an image of an action) or inverted (value "0" is seen as an image of an action) signal; select input related alarm control (enable/disable); select alarm working mode (normal or fail-safe); and select alarm timing value in seconds.

The input-related dynamic information includes: actual hardware input status; actual validated input status; alarm input status; alarm acknowledge status; last alarm raise date and time tag; and last reset/acknowledge raise date and time tag.

The analog input control screen gives in table form the following commands: select data source: hardware/network; select Auto/Manual working mode; input-related minimum value in count (default value: 0); input-related maximum value in count (default value: 32,000); input-related minimum value in engineering units; input-related maximum value in engineering units; select input-related alarm control value mode: 0=disable, 1=tracking on actual value, 2=tracking on minute-averaged value, 3=tracking on hourly-averaged value; select alarm set-point value in engineering units; select tripping set-point in engineering units; select alarm dead band value in engineering unit; select alarm timing value in seconds; do alarm acknowledge command; and do maximum value reset command.

The input-related provided information includes: actual hardware input value in engineering units; actual maximum input value in engineering units; input-related alarm status; input-related fault status (sensor and scaling); alarm acknowledge status; last maximum value; last maximum value date and time tag; last alarm raise date and time tag; last tripping raise date and time tag; and last reset raise date and time tag.

The MC software provides graphical trends of some analog inputs and calculated data for some selected time period: load current; top oil temperature; ambient temperature; winding hot-spot temperature; the hourly recorded load (current) of the previous day as a historical trend; and the hourly recorded load (current) of the running day as a real-time data trend.

The time scale preferably does not have a Date mark, but only an Hour mark. Therefore, both traces refer to the same hours from 0 AM to 12 PM (or from 0 to 24). The screen should also provide the ability to change the time scale and display real time current or archived data. The hourly data for the previous day and the running day are available from the transformer management system.

The security system management screen controls the action authorized by the operator. The operator does not do system configuration selection because the supervisor level has full control of the system.

The communication management screen gives access to dial communication, network configuration and transformer management system selection.

Alarm System

The alarm system in the PLC raises alarm flags following a system alarm raised condition. The MC monitors the alarm flags and, when required, it will read and record the alarms condition evolution to build historical alarm tracking.

Real-Time Alarm

The alarm status screen shows the actual status of all alarm outputs (on a table form), including for each output the time stamp of the last raising time, and the last reset time. This screen displays the actual PLC alarm output and model-related alarm outputs status. This screen allows each alarm to be acknowledged individually.

Historical Alarm

Fault display listing with time stamp may be available on the historical alarm screen. This screen reports the last alarm tag and raising/tripping time. For historical alarm listings to be used, the MC must be permanently connected to the network for real-time alarm monitoring.

Real-Time List of the Alarms with Date and Time Stamps
HYDRAN® HiHi alarm
HYDRAN® Hi alarm
HYDRAN® Fail alarm
top oil temperature alarm
winding hot-spot temperature alarm
liquid level alarm
pressure-vacuum alarm
sudden pressure alarm
gas accumulation alarm
pressure relief device alarm
cooling system alarm
OLTC temperature differential alarm
system watchdog alarm
bushing sum current alarm
Real-Time Trip Control Status with Date and Time Stamps
tripped on top oil temperature
tripped on winding hot-spot temperature tripped on OLTC fault
tripped on bushing sum current deviation
Alarm and Trip Set-Point Adjustments The following alarm and trip set-points should be sent to the TMU by the MC: top oil temperature set-point; winding hot-spot temperature set-point; cooling system operation temperature set-point; OLTC temperature differential set-point; bushing sum current set-point; top oil trip set-points; and hot-spot temperature trip set-point.

Entering Data Manually

The example GUI provides the capability of entering the following data on the client processing system screen: system configuration on Configuration screen(s); transformer data limited to those required for model computation, entered on Constant screen(s); miscellaneous constants required for model computations, entered on Constant screen(s); miscellaneous information required for system, control, communication and reporting configuration; alarm and trip set-points, entered on alarm management screen(s); and manual inputs used by the DGA model and the loading guide model.

Results Display

Figure 5A:
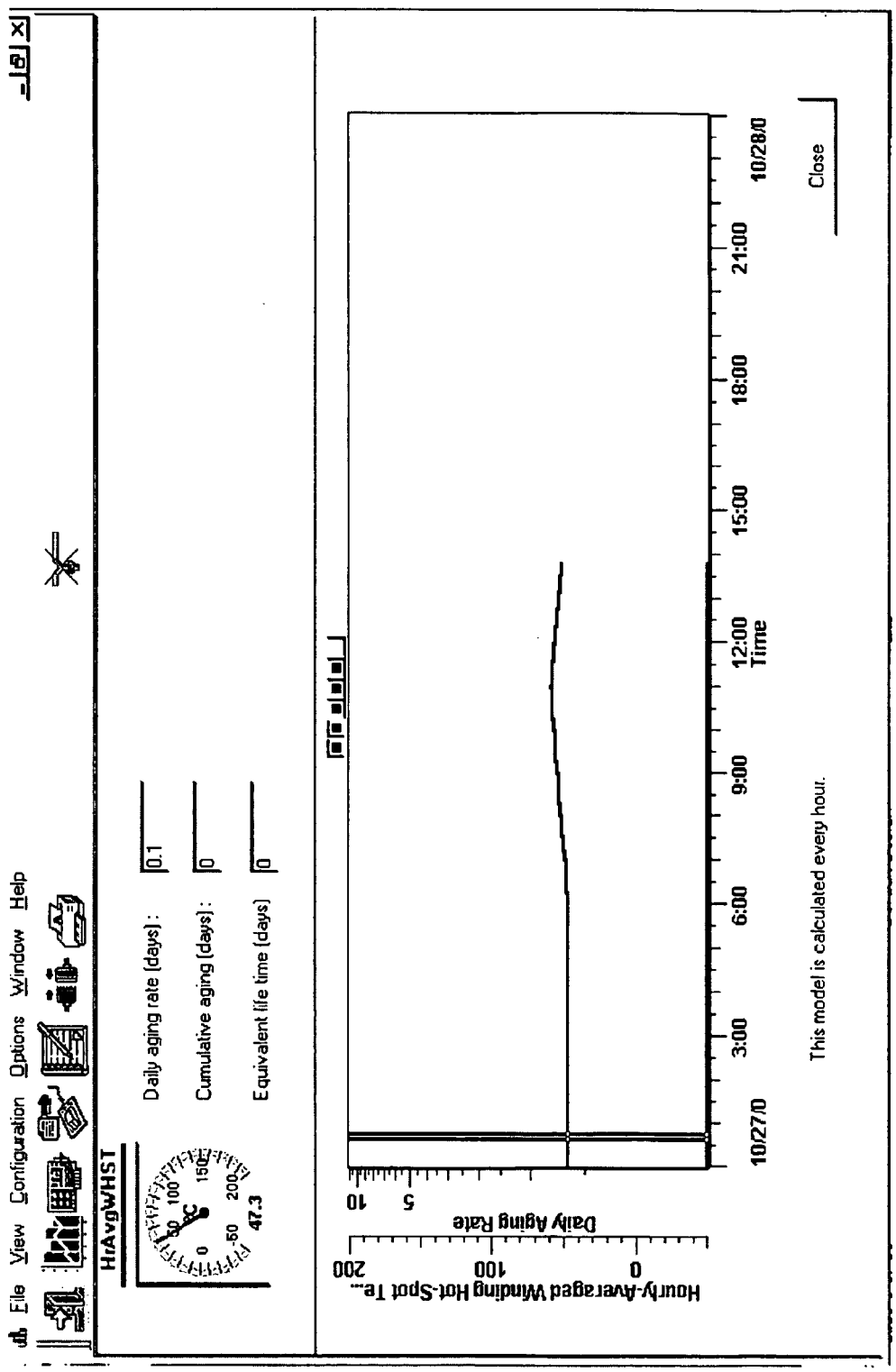
FIGS. 5A–5N are illustrations of various example display screens.
Figure 5B:
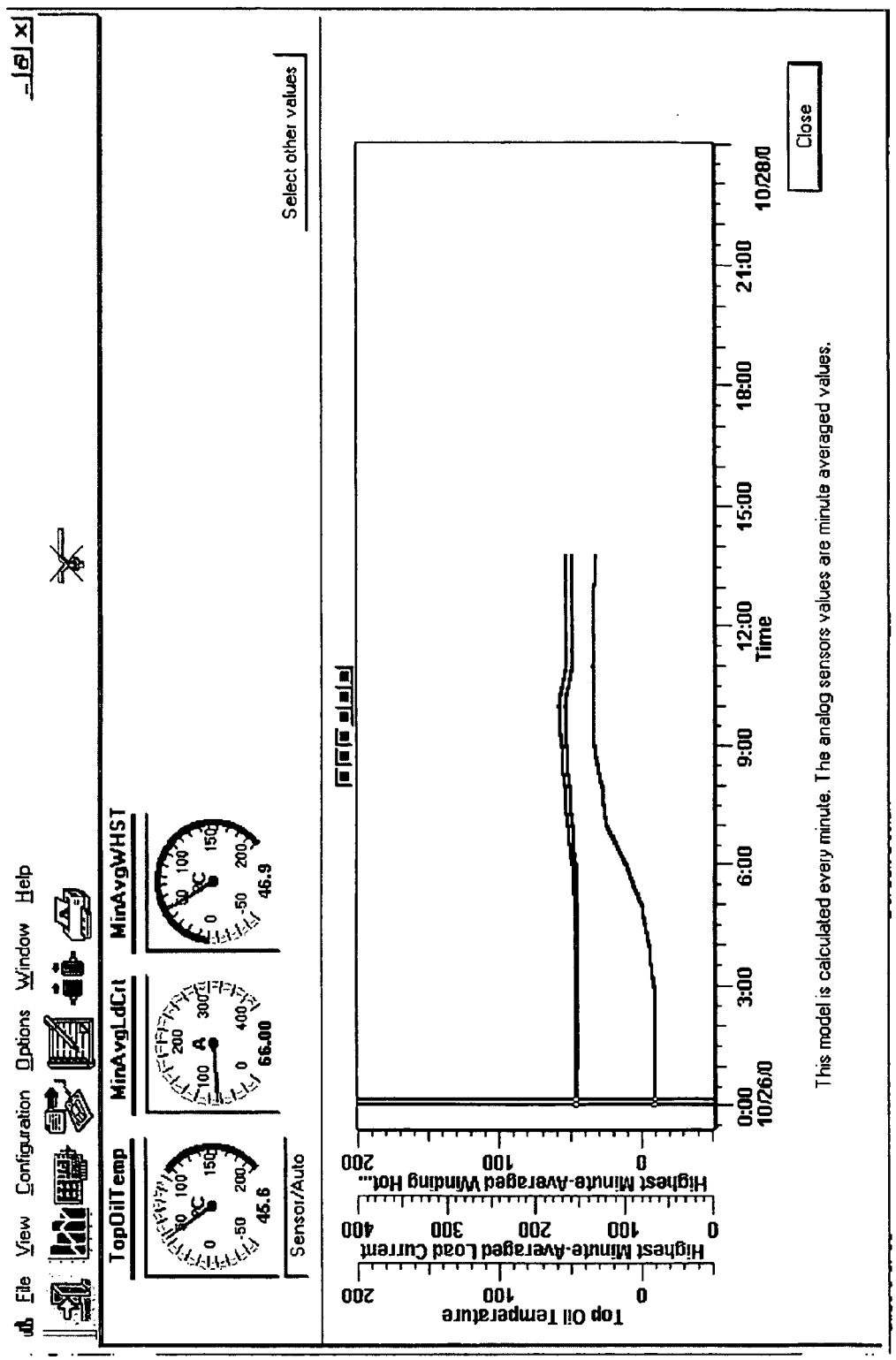
Figure 5C:
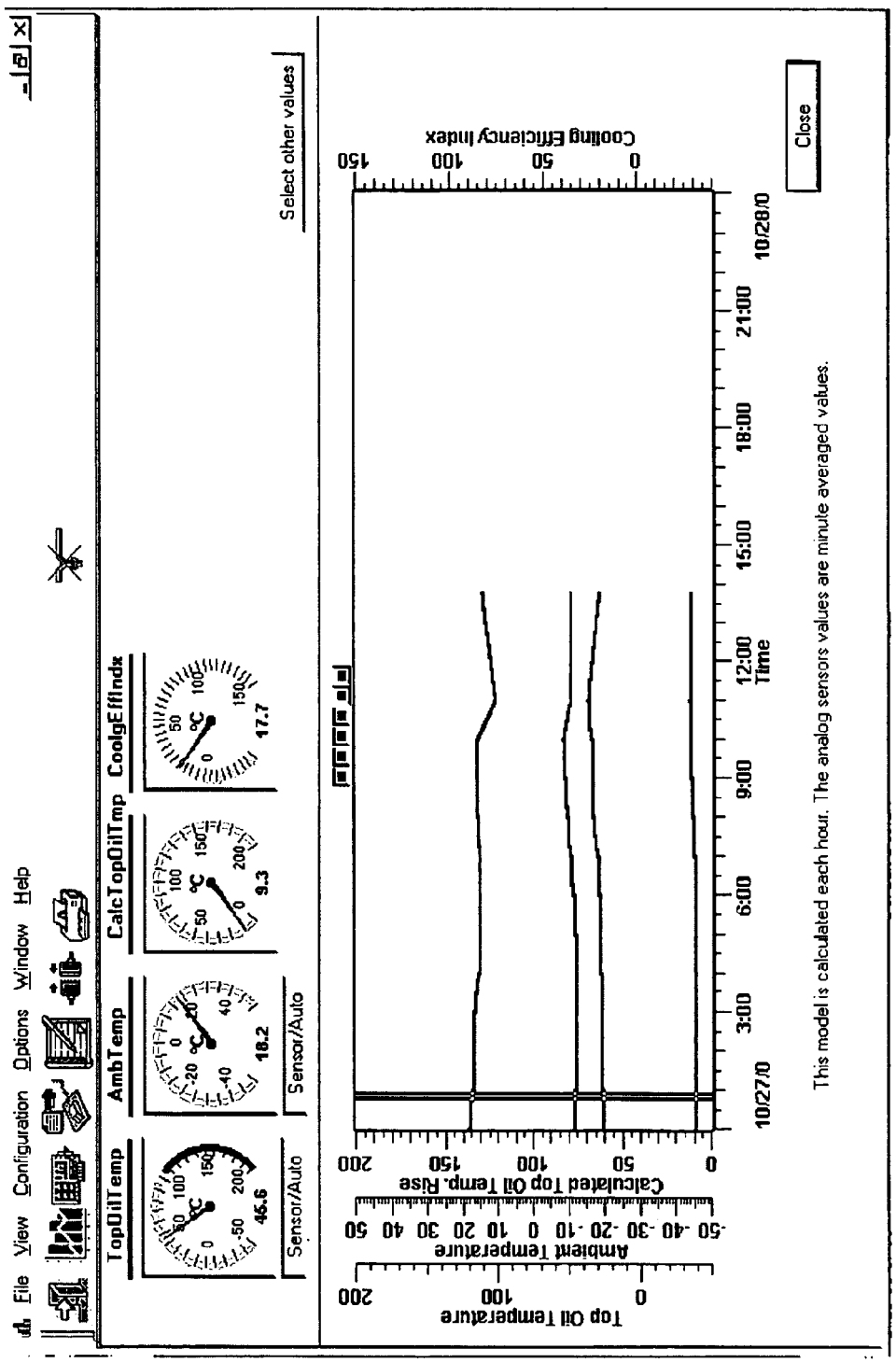
Figure 5D:
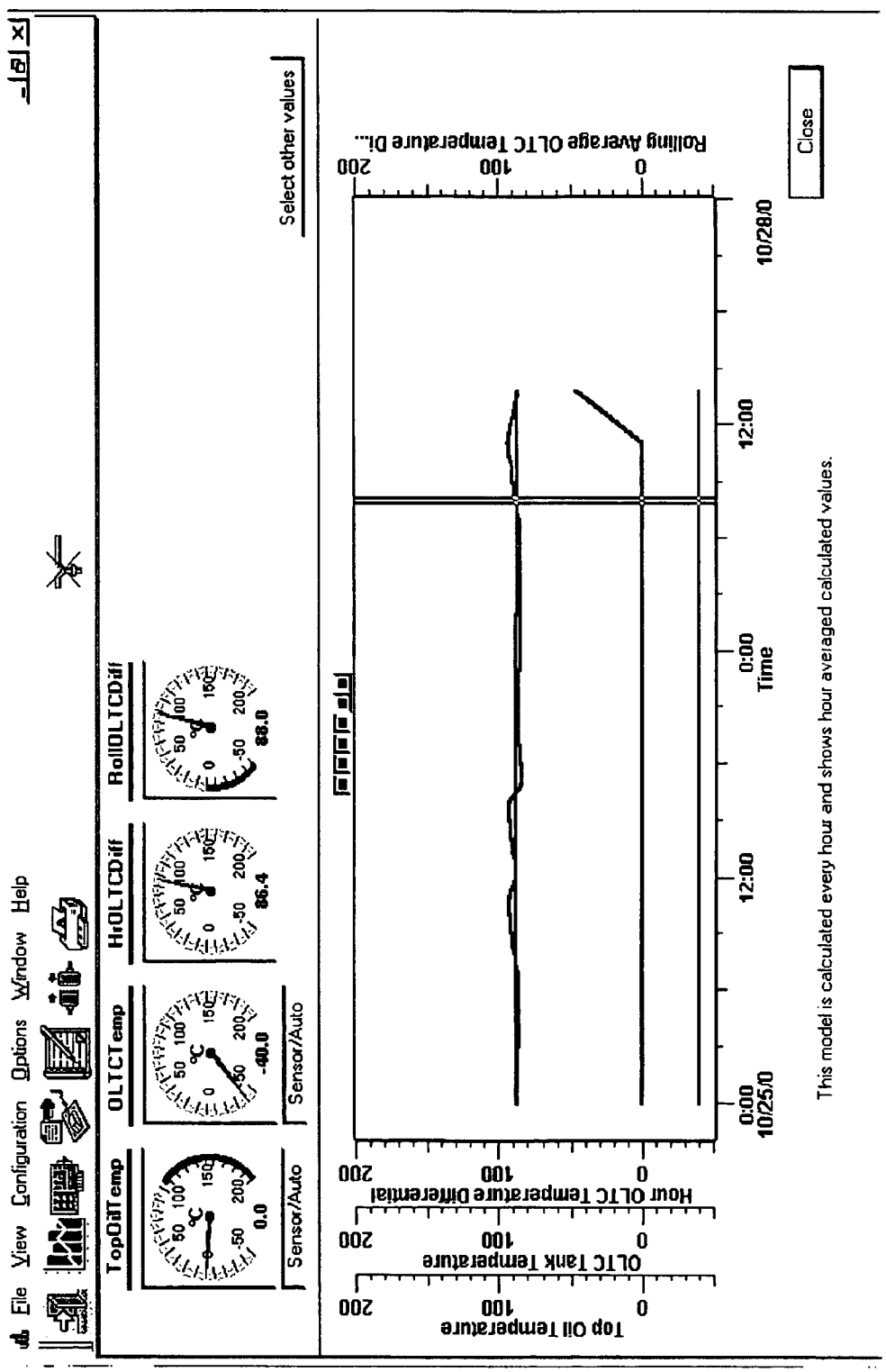
Figure 5E:
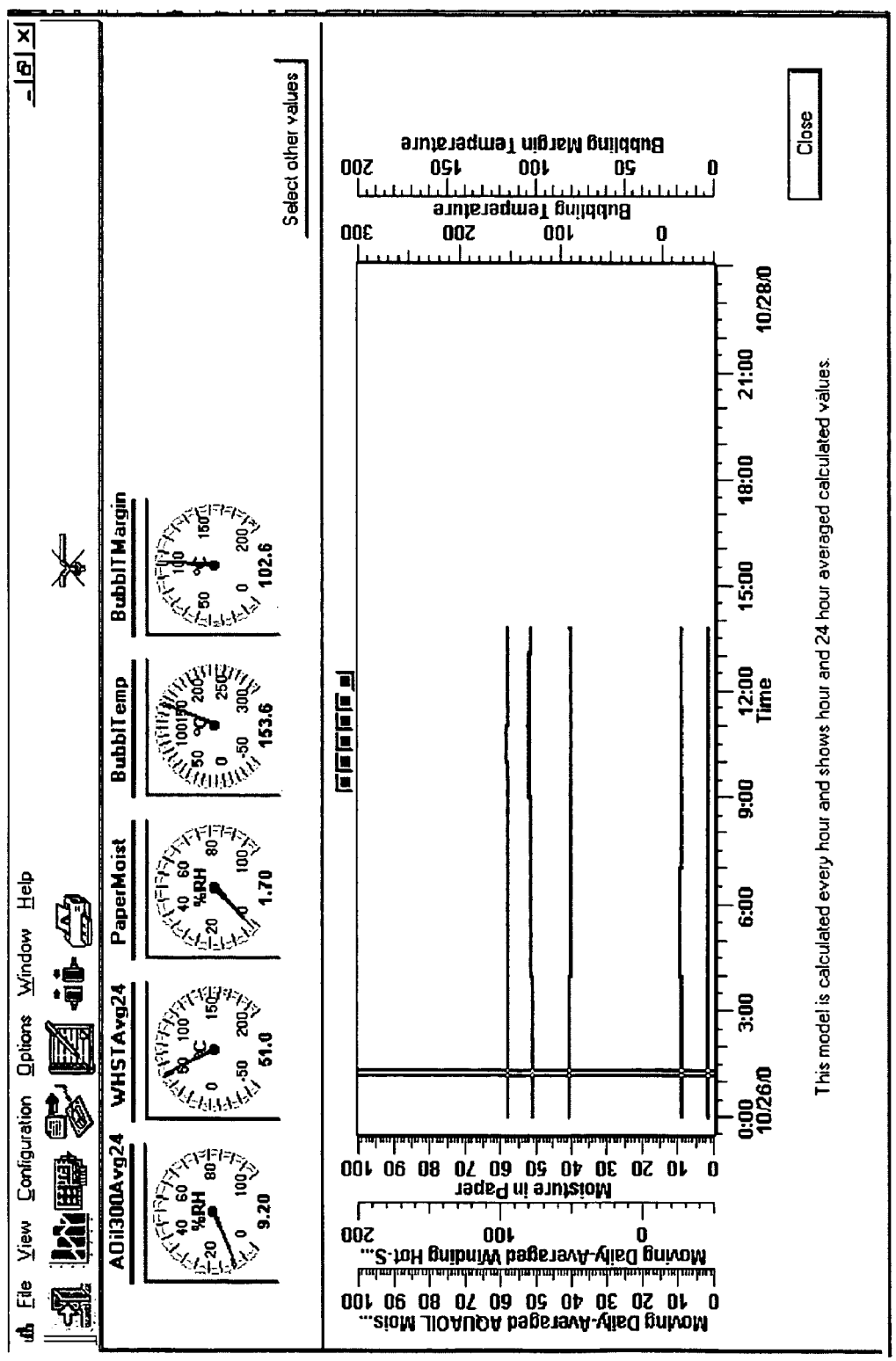
Figure 5F:
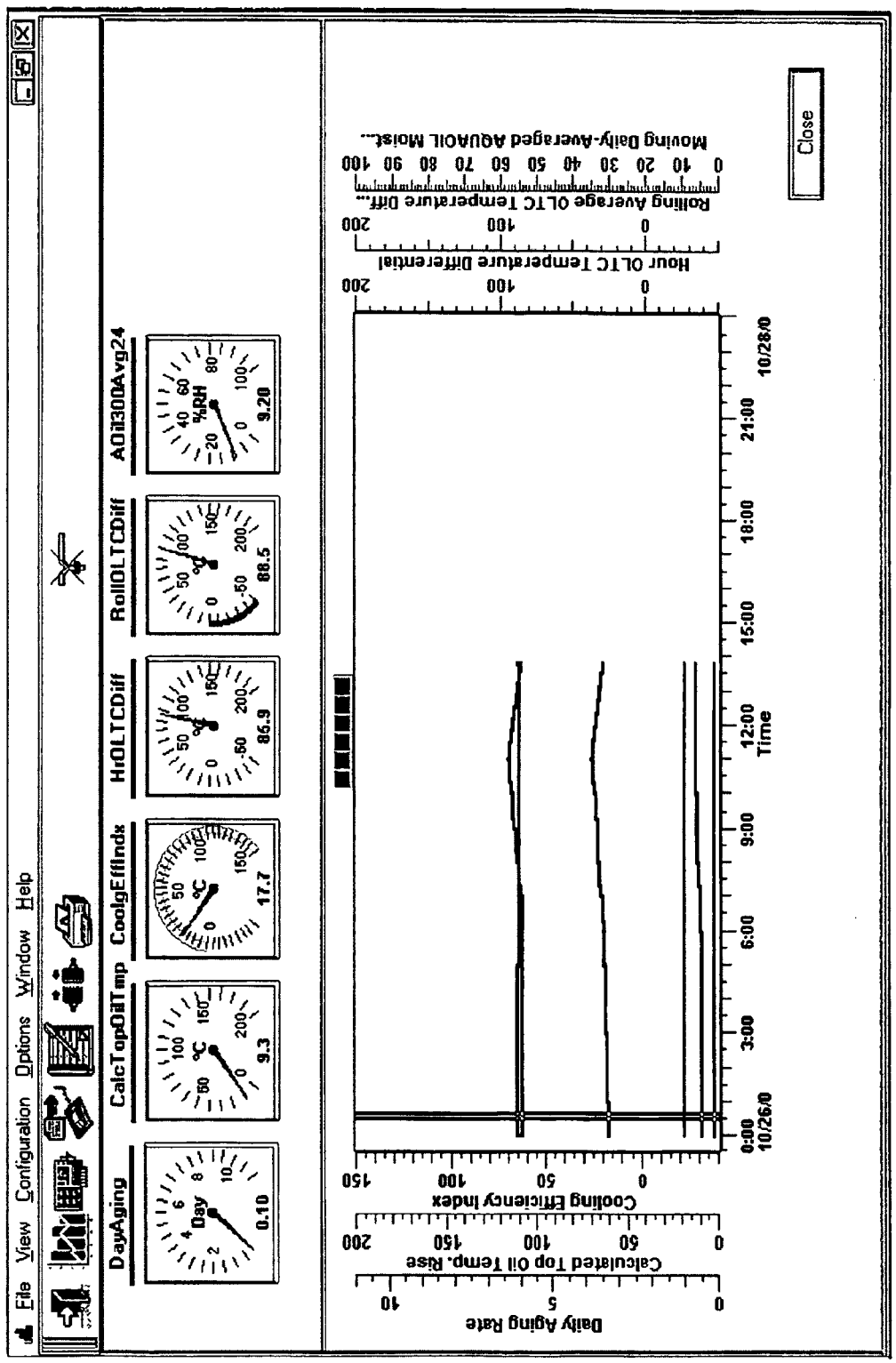
Figure 5G:
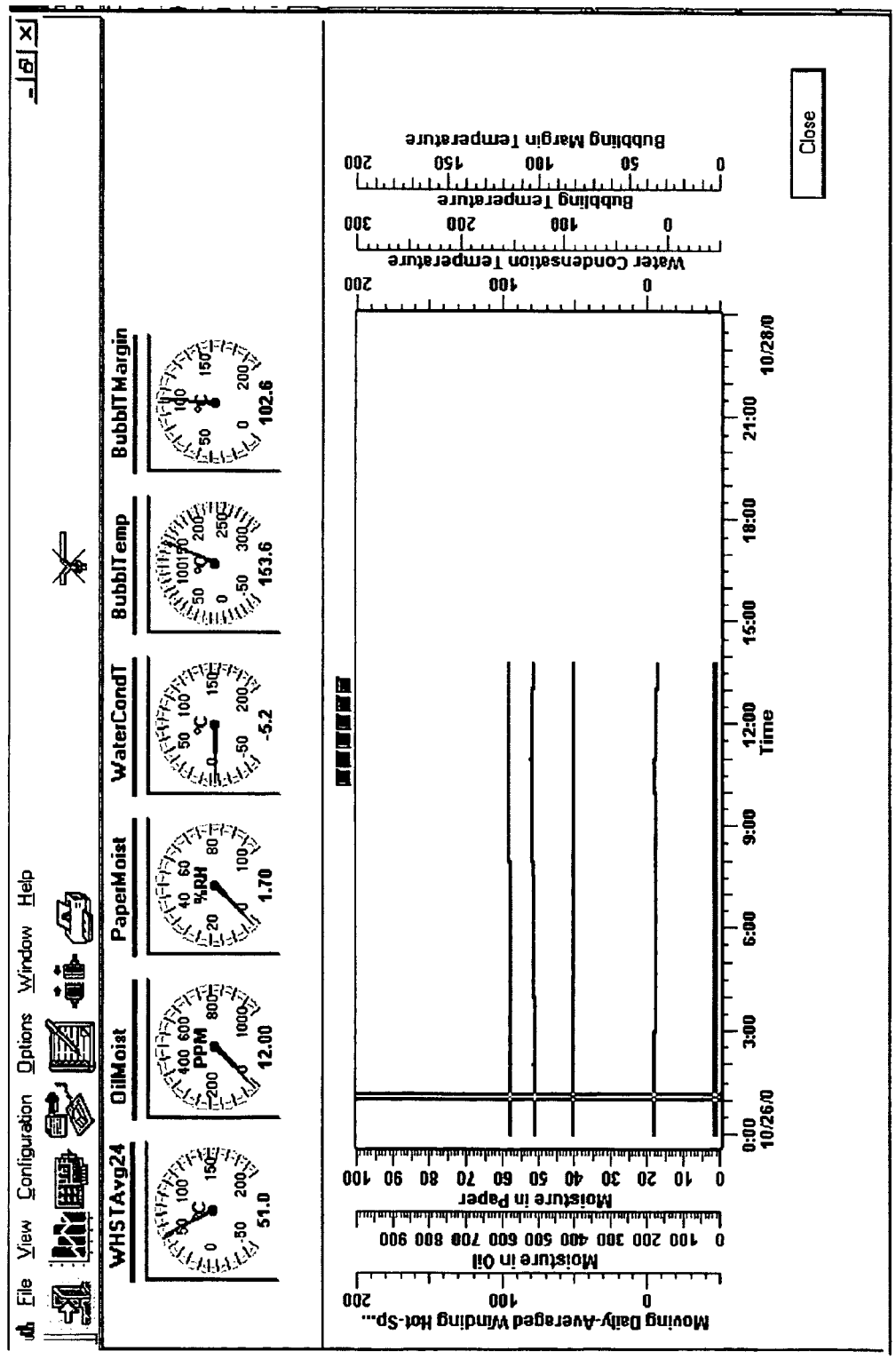
Figure 5H:
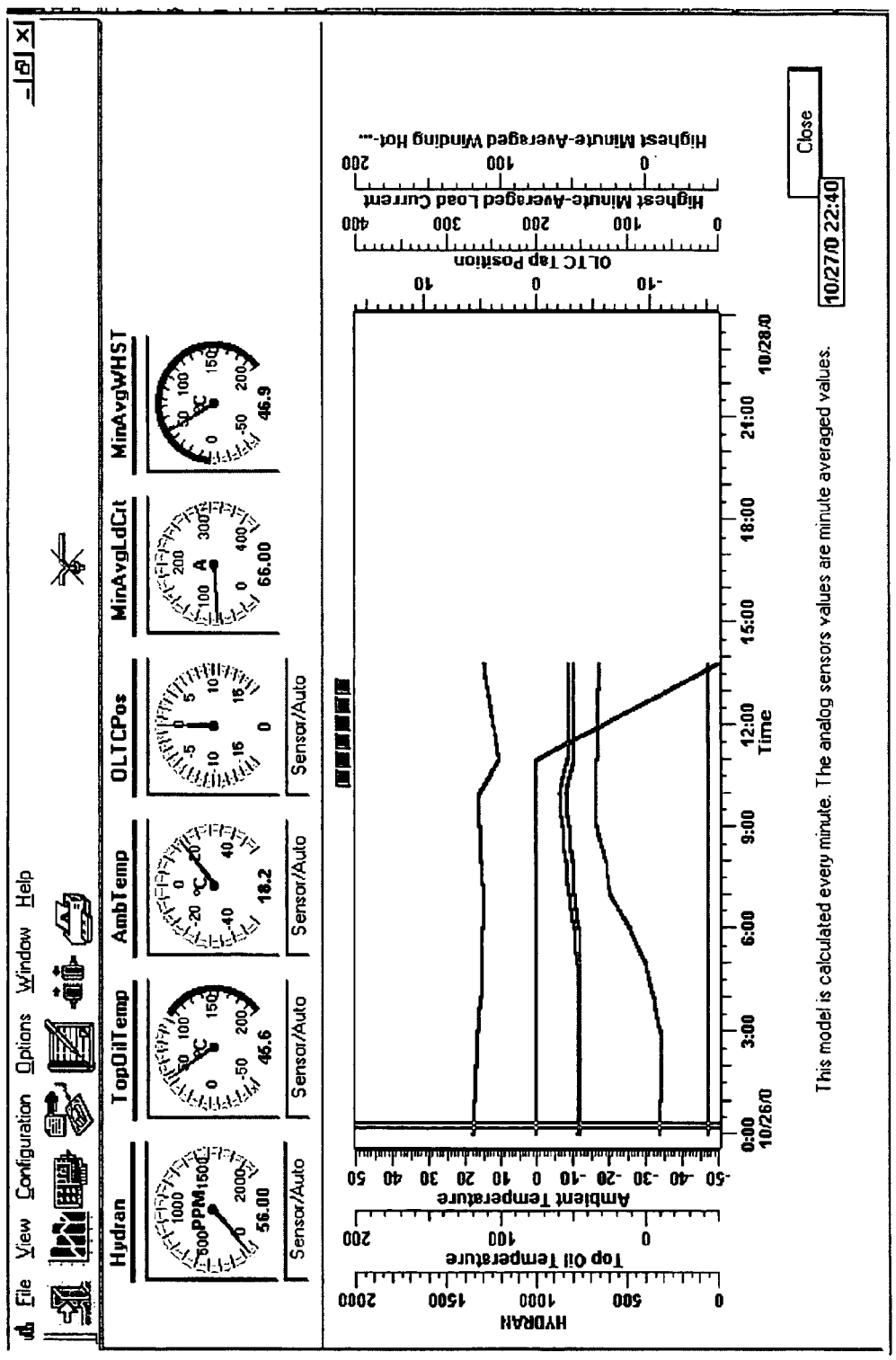
Figure 5I:
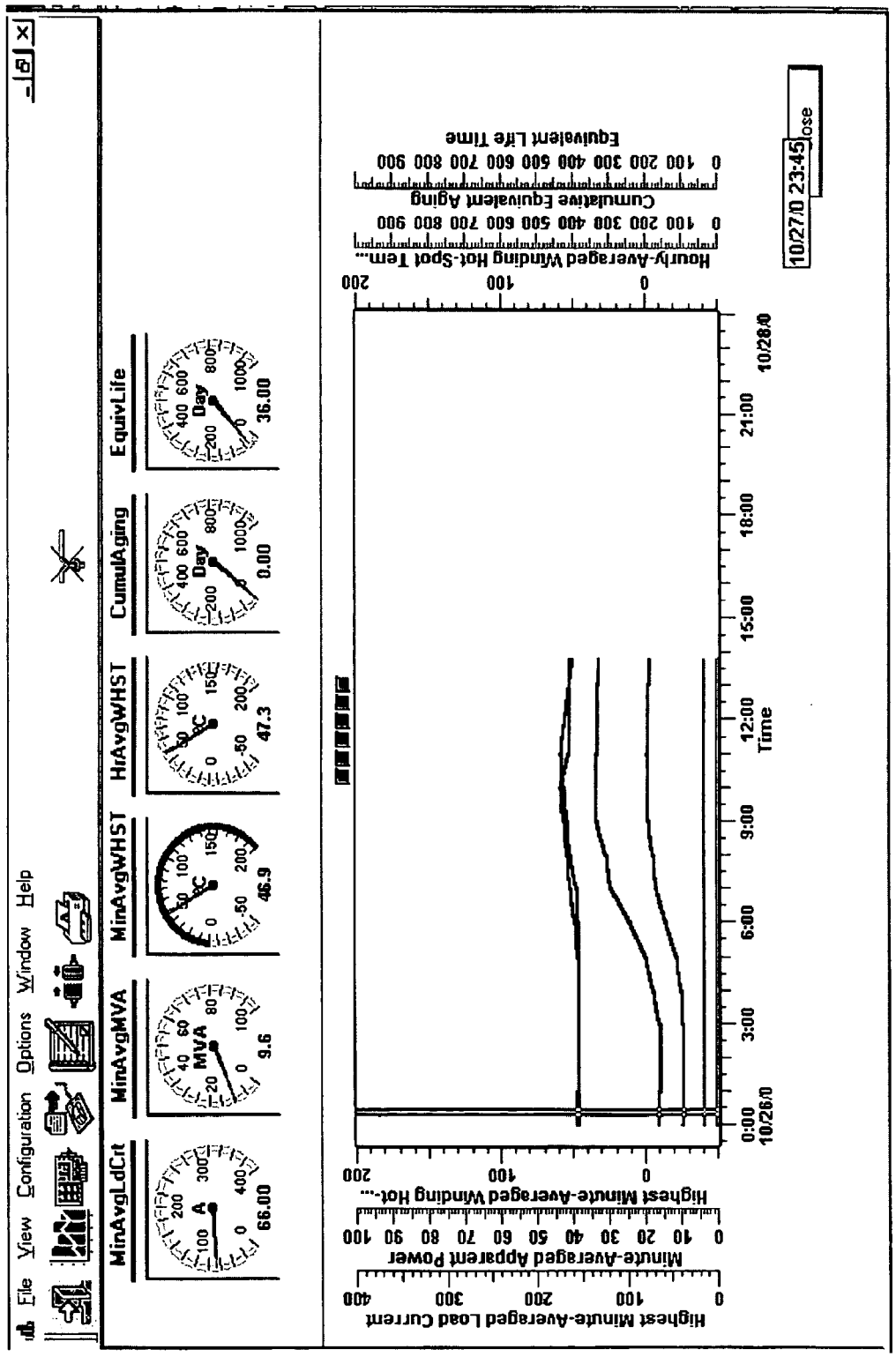
Figure 5J:
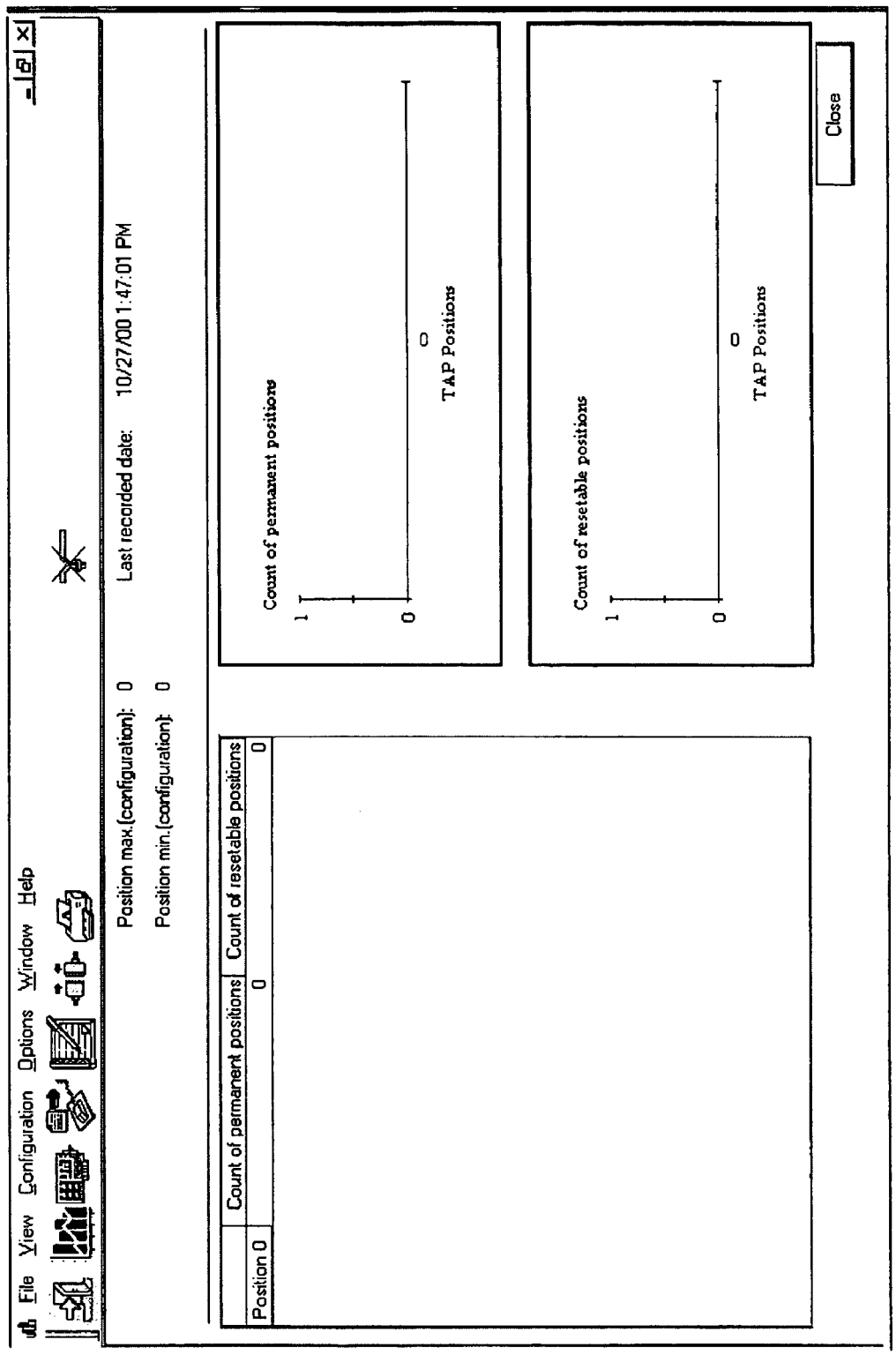
Figure 5K:
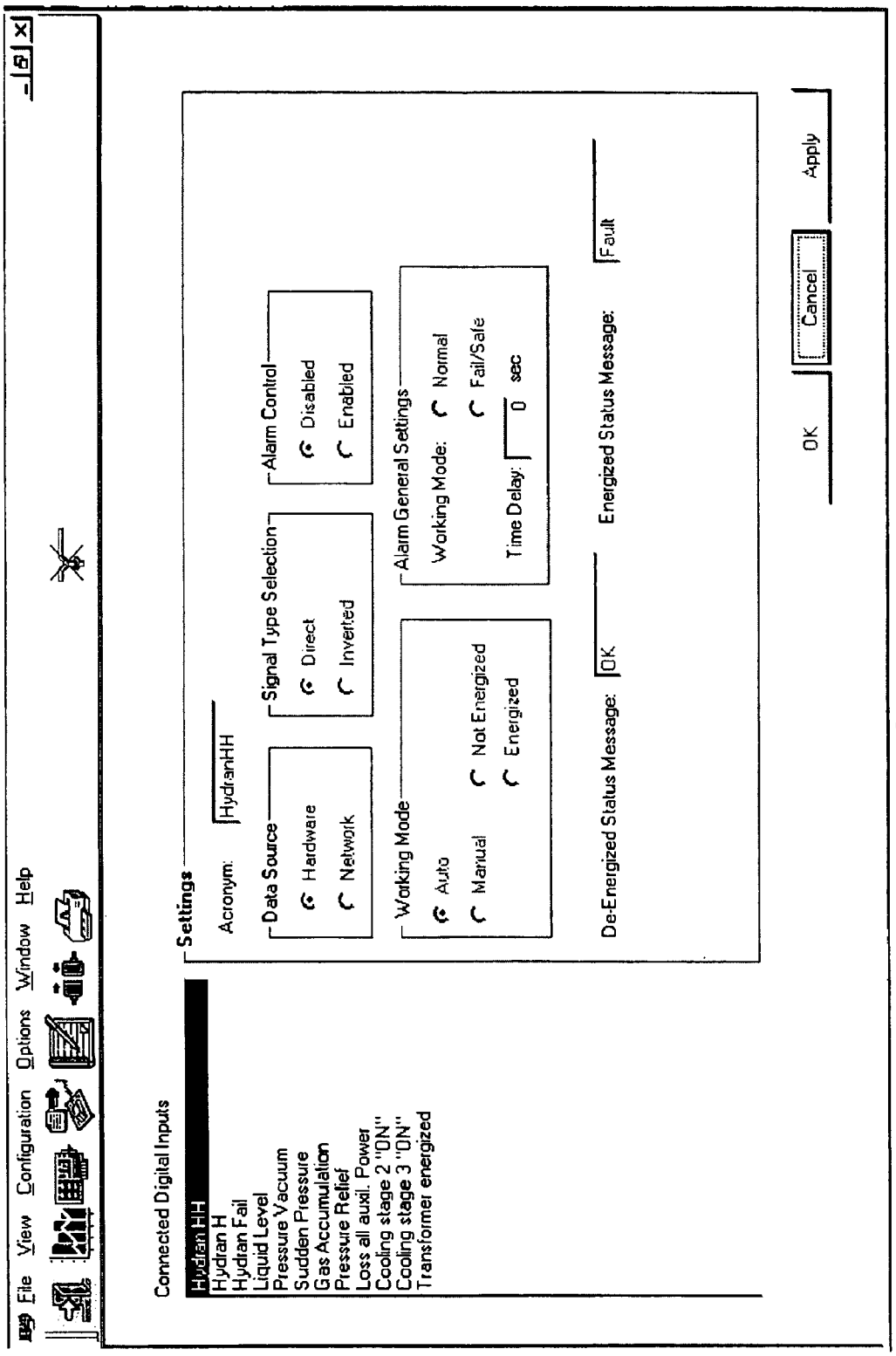

The example GUI provides a display of results, interpretations, diagnostics and recommendations from models and necessary actions to be taken. These models include:
Load Current Model
MVA Model
Winding Hot-Spot Temperature Model
Insulation Aging
Daily Aging
Cumulative Aging
Cooling System Status Model
Cooling Efficiency Model
OLTC Temperature Model
OLTC Tap Position Tracking Model, historical and most recent from last reset
Bushing Sum Current Model
Other models include:
DGA's
Predictive Loading Guide
Expert system transformer diagnostic function
Alarm and Trip Set-Point Adjustments The following can be provided on an Alarm Management screen (in table form) in the example GUI:
top oil temperature set-point
winding hot-spot temperature set-point
cooling system set-point
OLTC temperature differential set-point
bushing sum current set-point
top oil trip set point
winding hot-spot trip set-point
time/date stamp of each last individual reset command FIGS. 5A–5N are illustrations of various example display screens. FIGS. 5A–5J are screens for depicting various measured or computed values, both using display dials and trending graphs. The display of multiple trends in the trending graph display is facilitated by using different colors for each trend value. The colors associated with each dial may be the same as the color of the corresponding value in the trending graph. FIGS. 5K–5N are configuration screens. Specifically, FIG. 5K shows a screen for configuring the settings of the connected digital inputs. The user can select a digital input from the list box on the left-hand side of the screen and then configure the settings (e.g., data source, signal type selection, alarm control, working mode, alarm general settings, and status messages) for the selected input.

Figure 5L:
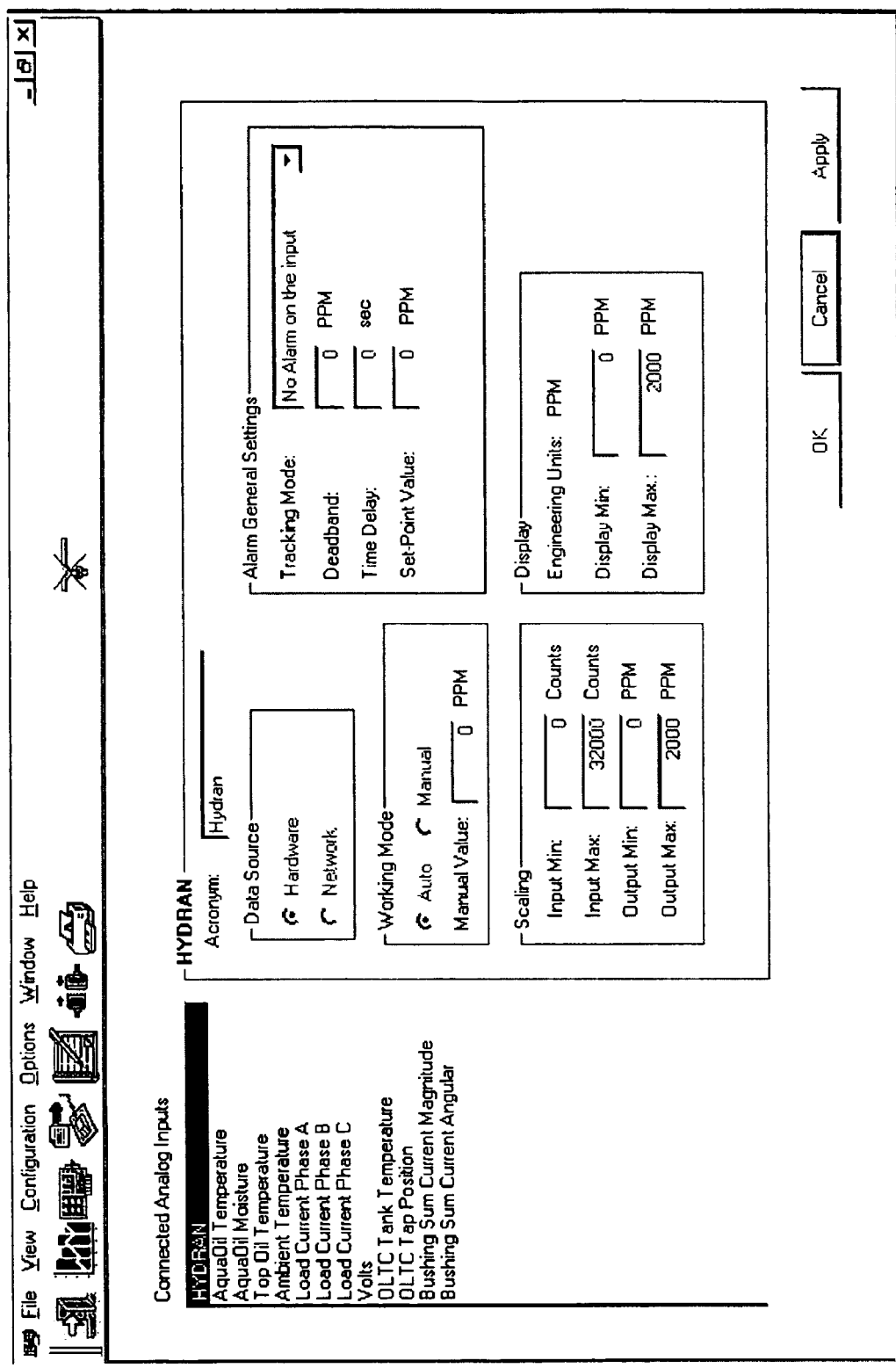
Figure 5M:
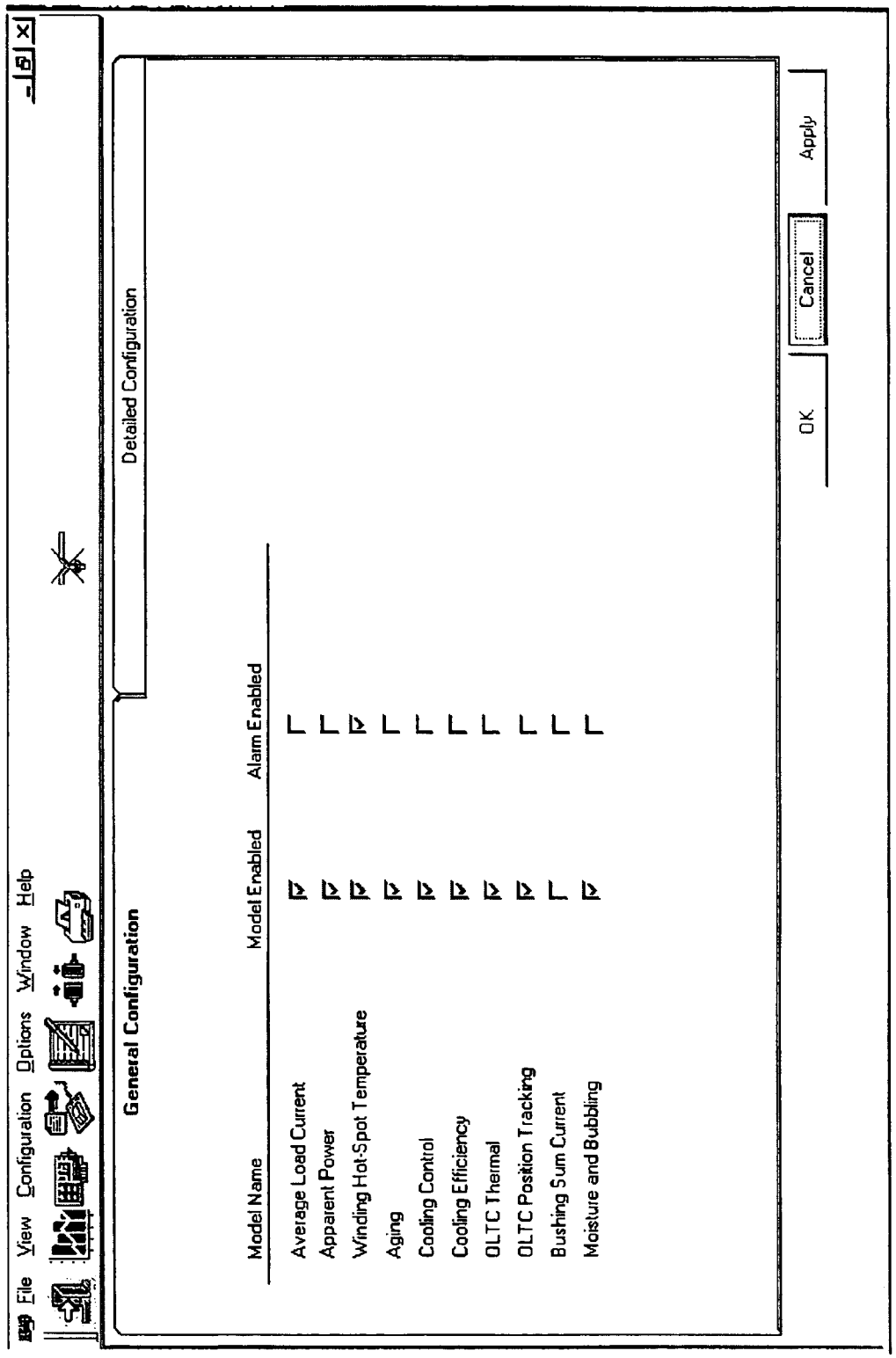
Figure 5N:
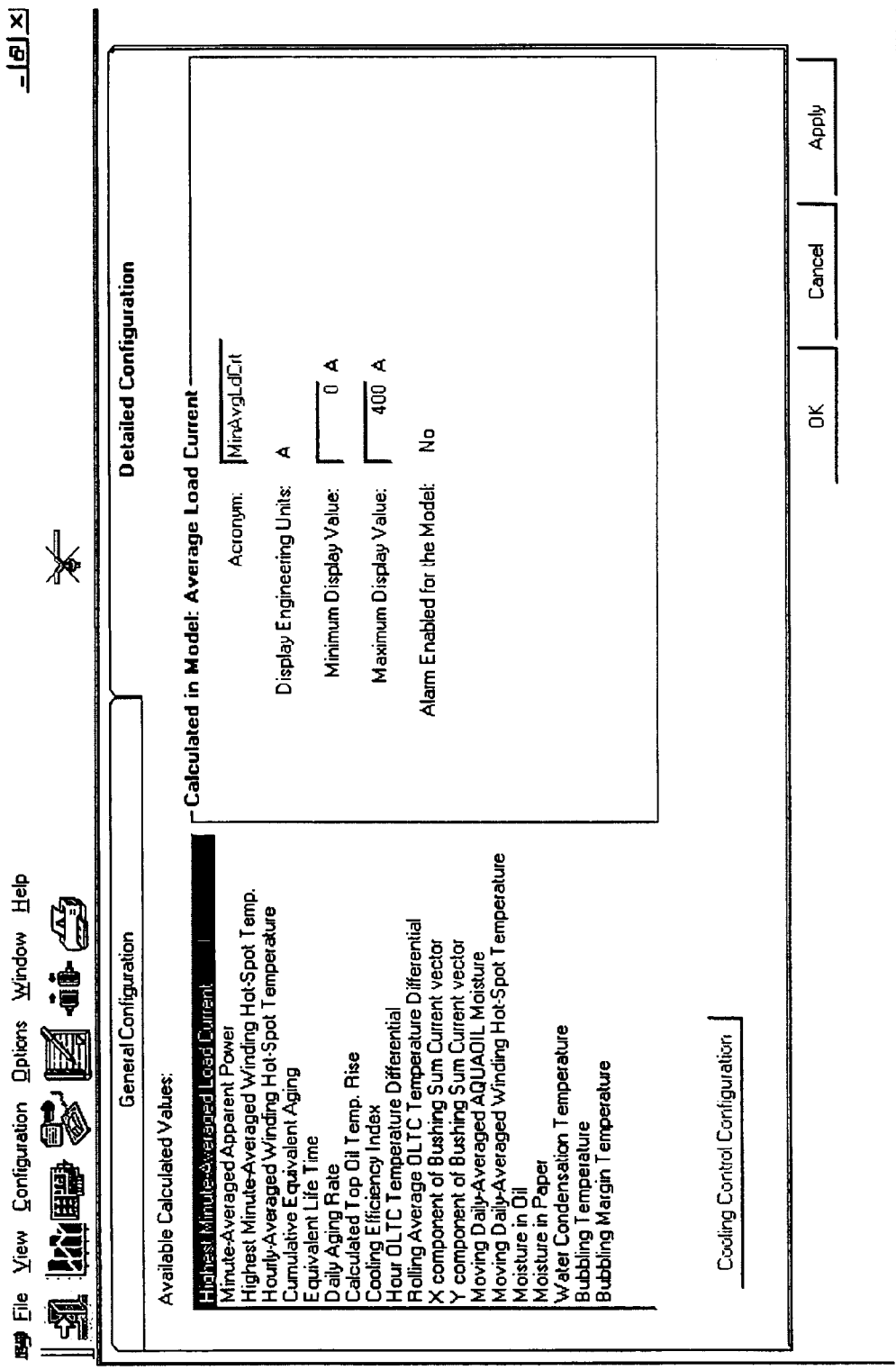

FIG. 5L shows a similar screen for configuring the settings of analog inputs (e.g., data source, alarm general settings, working mode, scaling, and display). FIG. 5M shows a general configuration screen in which models can be selectively enabled/disabled and the alarms for each model can also be selectively enabled/disabled. The detailed configuration screen shown in FIG. 5N includes a list box of calculated values and various details about the value selected in the list box. Some of theses details are configurable (e.g., minimum display value, maximum display value).

The systems and methods described above involve comparing the monitored parameter values of a transformer with values that are calculated from models for mathematically modeling the behavior of a transformer. This approach provides accurate current information about the health of a transformer and allows utilities to plan and schedule maintenance in advance and only as required. This approach can significantly reduce maintenance costs for utilities as unnecessary maintenance can be avoided and the risk of a transformer having a forced outage is greatly reduced.

The contents of any technical documents identified in the above description are incorporated herein by reference.

While the invention has been described in connection with what is presently considered to be the most practical and preferred embodiment, it is to be understood that the invention is not be limited to the disclosed embodiment, but on the contrary, is intended to cover various modifications and equivalent arrangements included within the spirit and scope of the appended claims.

What is claimed is:

1. A transformer management system, comprising:
at least one sensor for sensing at least one physical quantity associated with the operation of a transformer; and
processing circuitry for using the at least one sensed physical quantity to calculate a value from a mathematical model for representing behavior of the transformer, for comparing the calculated value to a threshold value, and for generating an output based on the result of the comparison.

2. The transformer management system according to claim 1, wherein the processing circuitry also uses an output from the mathematical model to calculate a value for another mathematical model.

3. The transformer management system according to claim 1, wherein the at least one sensor comprises an analog sensor.

4. The transformer management system according to claim 1, wherein the at least one sensor comprises a digital sensor.

5. The transformer management system according to claim 1, wherein the at least one sensor comprises an analog first sensor and a digital second sensor.

6. The transformer management system according to claim 1, wherein the output generated by the processing circuitry comprises an alarm.

7. The transformer management system according to claim 1, wherein the output generated by the processing circuitry comprises a cooling system ON/OFF signal.

8. The transformer management system according to claim 1, further comprising: communication circuitry for communication with a remotely located processing system.

9. The transformer management system according to claim 8, further comprising: an interface for at least providing inputs to and receiving outputs from the processing circuitry.

10. The transformer management system according to claim 1, wherein the processing circuitry comprises a programmable logic controller.

11. The transformer management system according to claim 1, further comprising: a memory for storing one or more sensed physical quantities.

12. The transformer management system according to claim 1, wherein the threshold value is user-configurable.

13. The transformer management system according to claim 1, wherein the output is a transformer control signal.

14. A method of managing a transformer, comprising:
sensing at least one physical quantity associated with the operation of a transformer;
using the at least one sensed physical quantity to calculate a value from a mathematical model for representing the behavior of the transformer;
comparing the calculated value to a threshold value; and
generating an output based on the result of the comparison.

15. The method according to claim 14, wherein the output comprises an alarm.

16. The method according to claim 14, wherein the output comprises a transformer cooling system ON/OFF signal.

17. The method according to claim 14, further comprising: storing one or more sensed physical quantities.

18. The method according to claim 14, wherein the at least one sensed physical quantity comprises an analog physical quantity.

19. The method according to claim 14, wherein the at least one sensed physical quantity comprises a digital physical quantity.

20. The method according to claim 14, wherein the at least one sensed physical quantity comprises an analog first physical quantity and a digital second physical quantity.

21. The method according to claim 14, further comprising: communicating with a remotely located processing system.

22. The method according to claim 14, wherein the threshold value is user-configurable.

23. The method according to claim 14, wherein the output is a transformer control signal.

24. A transformer management system, comprising:
a plurality of transformer management units, each unit comprising at least one sensor for sensing at least one physical quantity associated with the operation of an associated transformer,
processing circuitry for using the at least one sensed physical quantity to calculate a value from a mathematical model for representing behavior of the transformer, for comparing the calculated value to a threshold value, and for generating an output based on the result of the comparison; and
a remote processing system in communication with the plurality of transformer management units.

25. The transformer management system according to claim 24, wherein the remote processing system is in communication with the plurality of transformer management units via a wired communication link.

26. The transformer management system according to claim 25, wherein the wired communication link is the Internet.

27. The transformer management system according to claim 24, wherein the remote processing system is in communication with the plurality of transformer management units via a wireless communication link.

28. The transformer management system according to claim 24, wherein the processing circuitry of each transformer management unit also uses an output from the mathematical model to calculate a value for another mathematical model.

29. The transformer management system according to claim 24, wherein the at least one sensor of each transformer management unit comprises an analog sensor.

30. The transformer management system according to claim 24, wherein the at least one sensor of each transformer management unit comprises a digital sensor.

31. The transformer management system according to claim 24, wherein the at least one sensor of each transformer management unit comprises an analog first sensor and a digital second sensor.

32. The transformer management system according to claim 24, wherein the output generated by the processing circuitry of each transformer management system comprises an alarm.

33. The transformer management system according to claim 24, wherein the output generated by the processing circuitry of each transformer management unit comprises a cooling system ON/OFF signal.

34. A method of managing a transformer, comprising:
(a) initializing operation of a transformer management system, the initializing comprising writing and updating of constants used by the transformer management system and generating flags and triggers used to used to synchronize execution of at least one function and at least one model of the transformer management system;
(b) inputting at least one sensor signal to the transformer management system and validating the sensor signal;
(c) determining whether a computation of a model of the transformer management system is scheduled;
(d) performing a scheduled model computation using the at least one sensor signal;
(e) comparing an output of the model computation with a predetermined value; and
(f) generating a transformer management system output based on the comparing.

35. The method according to claim 34, wherein the transformer management system output comprises an alarm.

36. The method according to claim 34, wherein the transformer management system output comprises a transformer cooling system ON/OFF signal.

37. The method according to claim 34, further comprising: storing the at least one sensor signal.

38. The method according to claim 34, wherein the at least one sensor signal represents an analog physical quantity.

39. The method according to claim 34, wherein the at least one sensor signal represents a digital physical quantity.

40. The method according to claim 34, wherein the at least one sensor signal includes a first sensor signal representing an analog physical quantity and a second sensor signal representing a digital physical quantity.

41. The method according to claim 34, further comprising: communicating with a remotely located processing system.

42. The method according to claim 34, further comprising:
generating date and time data and synchronizing the generated date and time data with reference date and time data.

43. The method according to claim 34, further comprising: continuously repeating steps (b)–(f).

44. A transformer management system, comprising:

at least one sensor for sensing at least one physical quantity associated with the operation of a transformer;

a programmable logic controller for using the at least one sensed physical quantity to calculate a value from a mathematical model for representing behavior of the transformer, for comparing the calculated value to a threshold value, and for generating a cooling system ON/OFF signal based on the result of the comparison;

an interface for at least providing inputs to and receiving outputs from the processing circuitry; and communication circuitry for communication with a remotely located processing system, wherein the processing circuitry also uses an output from the mathematical model to calculate values for another mathematical model.

45. A method of managing a transformer, comprising:

providing a user interface that enables a user to selectively enable/disable one or more mathematical models for representing the behavior of the transformer;

sensing at least one physical quantity associated with the operation of the transformer;

using the at least one sensed physical quantity to calculate a value from an enabled mathematical model;

comparing the calculated value to a threshold value; and generating an output based on the result of the comparison.

46. The method according to claim 45, wherein the user interface provides a display of the value calculated from the enabled mathematical model.

47. The method according to claim 45, further comprising:

performing computations of the enabled mathematical model in accordance with a schedule, wherein the user interface displays information regarding the schedule.

48. A transformer management system, comprising:

a user interface that enables a user to selectively enable/disable one or more mathematical models for representing the behavior of a transformer;

at least one sensor for sensing at least one physical quantity associated with the operation of the transformer; and processing circuitry for using the at least one sensed physical quantity to calculate a value from an enabled mathematical model, for comparing the calculated value to a threshold value, and for generating an output based on the result of the comparison.

49. The transformer management system according to claim 48, wherein the user interface provides a display of the value calculated from the enabled mathematical model.

50. The transformer management system according to claim 48, wherein the user interface enables the user to configure the at least one sensor.

51. The transform management system according to claim 48, wherein the processing circuitry computes the enabled mathematical model in accordance with a schedule and the user interface displays information regarding the schedule.

52. A storage device storing computer-executable instructions for performing a method of managing a transformer, the method comprising:

sensing at least one physical quantity associated with the operation of a transformer;

using the at least one sensed physical quantity to calculate a value from a mathematical model for representing the behavior of the transformer;

comparing the calculated value to a threshold value; and generating an output based on the result of the comparison.

* * * * *